US011043086B1

(12) United States Patent
Daoura et al.

(10) Patent No.: US 11,043,086 B1
(45) Date of Patent: Jun. 22, 2021

(54) VOICE-CODED FINDER AND RADIOTAG TRACKER

(71) Applicant: PB, Inc., Renton, WA (US)

(72) Inventors: Daniel J Daoura, Renton, WA (US); Nicholas R Pearson-Franks, Renton, WA (US)

(73) Assignee: PB Inc., Issaquah, WA (US)

( * ) Notice: Subject to any disclaimer, the term of this patent is extended or adjusted under 35 U.S.C. 154(b) by 0 days.

(21) Appl. No.: 16/164,479

(22) Filed: Oct. 18, 2018

Related U.S. Application Data

(60) Provisional application No. 62/574,538, filed on Oct. 19, 2017.

(51) Int. Cl.
*G08B 3/10* (2006.01)
*G06F 3/16* (2006.01)
(Continued)

(52) U.S. Cl.
CPC ............ *G08B 3/1008* (2013.01); *G06F 3/167* (2013.01); *G08B 7/06* (2013.01); *G10L 15/08* (2013.01);
(Continued)

(58) Field of Classification Search
CPC ......... G08B 3/1008; G08B 7/06; G06F 3/167; G10L 15/08; G10L 15/22; H04R 3/04; H04R 17/02
See application file for complete search history.

(56) References Cited

U.S. PATENT DOCUMENTS 4,101,873 A 7/1978 Anderson
4,507,653 A 3/1985 Bayer
(Continued)

FOREIGN PATENT DOCUMENTS

WO WO1994027230 A1 11/1994

OTHER PUBLICATIONS

PR_NEWSWIRE, JD.Com Introduces Industry's First Always-on Wake Word Bluetooth Headset with EOS S3 Platform. Published on-line Feb. 26, 2019.

*Primary Examiner* — Sisay Yacob
(74) *Attorney, Agent, or Firm* — Fogg & Powers, LLC

(57) ABSTRACT

A finder device typically attachable to a personal object, the device having utility in finding the object when lost or missing. The beacon recognizes a structured verbal code from a speaker and actuates a signal response effective in locating the object, even when out of sight. The response can take the form of a sound or other display to draw the user's attention to its location and may optionally be supplemented by a radio emission. A simple "finder" typically recognizes only one inquiry, such as "find keys", or at most two inquiries, such as "find keys" and "find me" (where "find me" is directed at an object selected by a user") and responds by actuating an audio, visual or tactile display. By providing a kit having multiple finders that each have one purpose selected from "find keys", "find wallet", "find phone", and so forth, a user can attach each finder to the corresponding object and quickly find the object when needed by speaking the code phrase. Advanced wireless radiotag finder-trackers may also be used for finding and tracking objects in a local environment or in any wider area. A radiotag finder-tracker can allow the user to program a signature phrase to be spoken or a radio signal that will actuate the beacon to make an audio, visual or tactile display as an aid in locating the object. In a basic mode, the notification function is simplified, requiring only a simple verbal command; and in more advanced modes, either verbal or radio commands may be given and advantageously supplement each other. In yet another embodiment, a "Help Me" command can be sent via the devices to an internet administrative site where the help request is processed and help is dispatched.

33 Claims, 17 Drawing Sheets

ADVANCED MODEL

COMPACT COMBINATION OF
VOICE FINDER AND BLUETOOTH TRACKER

(51) Int. Cl.
*H04R 17/02* (2006.01)
*H04R 3/04* (2006.01)
*G10L 15/22* (2006.01)
*G08B 7/06* (2006.01)
*G10L 15/08* (2006.01)

(52) U.S. Cl.
CPC ............... *G10L 15/22* (2013.01); *H04R 3/04* (2013.01); *H04R 17/02* (2013.01); *G10L 2015/088* (2013.01); *G10L 2015/221* (2013.01); *G10L 2015/223* (2013.01)

(56) References Cited

U.S. PATENT DOCUMENTS

| | | | |
|---|---|---|---|
| 5,570,081 A | 10/1996 | Holstrom | |
| 5,629,677 A | 5/1997 | Staino | |
| 5,673,023 A | 9/1997 | Smith | |
| 5,926,090 A * | 7/1999 | Taylor | G08B 21/023 |
| | | | 340/539.32 |
| 5,939,981 A | 8/1999 | Renney | |
| 6,573,832 B1 | 6/2003 | Fugere-Ramirez | |
| 9,569,950 B1 | 2/2017 | Eidtag | |
| 9,761,116 B2 * | 9/2017 | Dadu | H04M 1/72563 |
| 2008/0020782 A1 * | 1/2008 | Nasser | G08B 3/10 |
| | | | 455/456.1 |
| 2008/0186162 A1 * | 8/2008 | Rajan | G06F 21/88 |
| | | | 340/539.13 |
| 2010/0207781 A1 * | 8/2010 | Shuster | G08B 19/00 |
| | | | 340/8.1 |
| 2010/0315236 A1 * | 12/2010 | Sakargayan | H04M 1/72547 |
| | | | 340/571 |
| 2012/0258701 A1 * | 10/2012 | Walker | H04W 4/029 |
| | | | 455/419 |
| 2014/0149122 A1 * | 5/2014 | Zhang | G10L 15/22 |
| | | | 704/275 |
| 2014/0274211 A1 * | 9/2014 | Sejnoha | G10L 17/22 |
| | | | 455/563 |
| 2015/0070184 A1 * | 3/2015 | Dadu | G08B 21/24 |
| | | | 340/692 |
| 2017/0132904 A1 * | 5/2017 | Dadu | G08B 21/24 |

* cited by examiner

VOICE FINDER

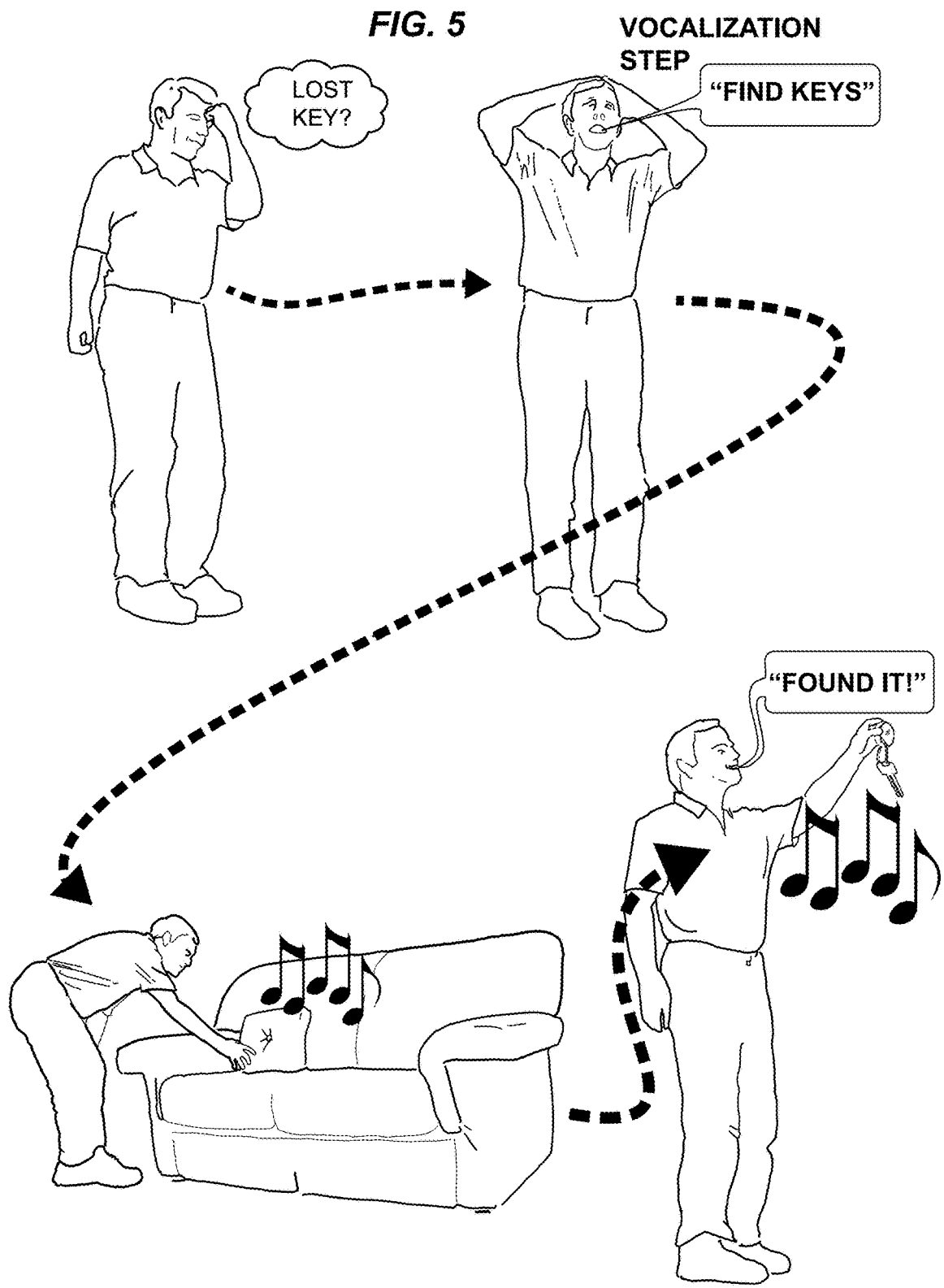

"FIND KEYS"

ATTENTION  DEFINE

ADVANCED MODEL

COMPACT COMBINATION OF
VOICE FINDER AND BLUETOOTH TRACKER

WAYTRACKING w/ LOGGING ON A BUS ROUTE

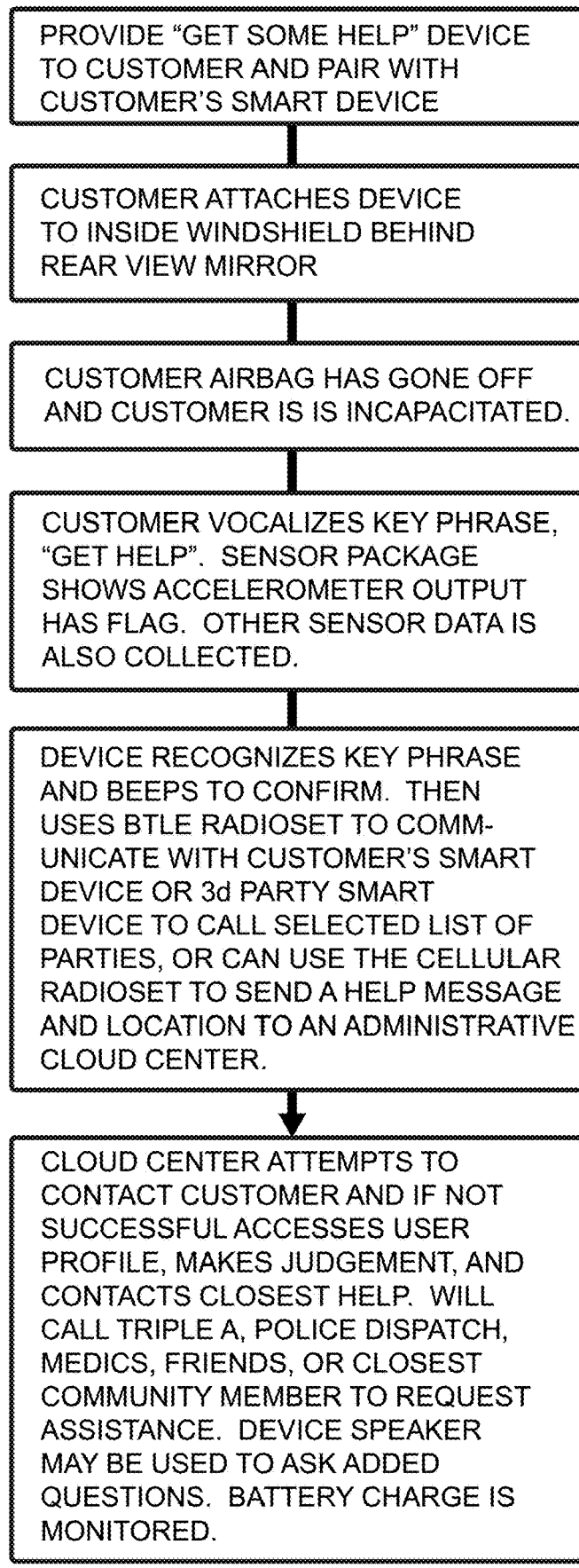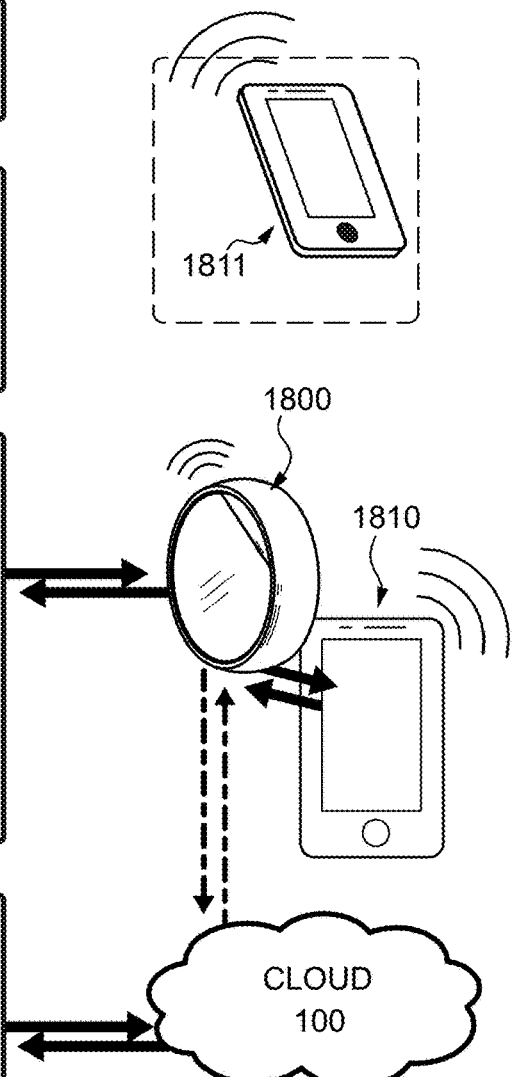
FIG. 18

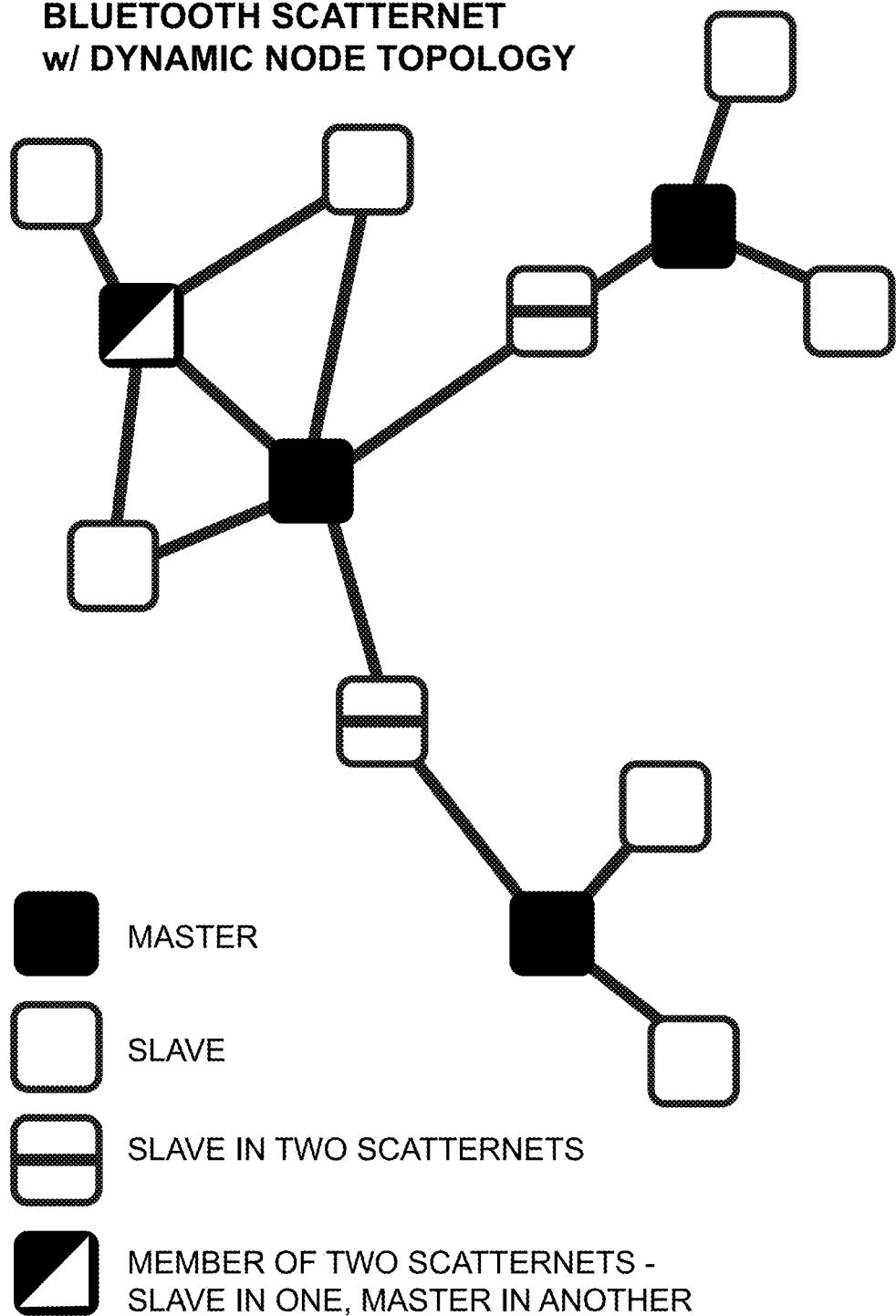

VOICE-CODED FINDER AND RADIOTAG TRACKER

CROSS REFERENCE TO RELATED APPLICATIONS

This application is related to and claims priority to U.S. Provisional Patent No. 62/574,538 entitled "Voice-Coded Tracker and Finder," filed Oct. 19, 2017 which is herein incorporated in full by reference for all purposes. This application is further related to U.S. Pat. Nos. 9,392,404 and 9,564,774, which are co-owned and are incorporated herein in full by reference for all purposes. This application is related to U.S. patent application Ser. No. 14/301,236, filed 10 Jun. 2014, which is co-owned and is incorporated herein in full by reference for all purposes. Also co-owned and included here by reference for all that it teaches is U.S. Prov. Pat. No. 62/732,945, filed 18 Sep. 2018, and titled "HYBRID CELLULAR BEACON DEVICES, ITO SYSTEMS AND METHODS".

GOVERNMENT SUPPORT

Not Applicable.

TECHNICAL FIELD

This disclosure pertains generally to the field of solutions utilizing a radio communications device or devices as a locating beacon and a message relay when acoustically activated by a human voice.

BACKGROUND

It is a fact of life that most people spend a significant level of time looking for personal objects that have been put down and forgotten, misplaced, or are concealed under something else. The long-awaited internet of things (IOT) that was intended to solve all the problems has not solved this everyday problem; it is unusable and too complicated, especially for the young and the elderly, who have not had years of experience negotiating the digital jungle or modern life. What is needed is a simple solution that helps people stay organized and find things when needed. More complex systems and devices are also needed when things are lost outside the home, particularly if the same device can be easily adapted to keeping track of things in real time—even things that are moving. The complexity has limited penetration of IOT devices into the consumer's acceptance and as a result, sales have not met even a small fraction of the potential market.

The President of the United States now has the means on his desk to send a message warning of an impending disaster to every cell phone in the country, but for an ordinary person, setting up a system to dial up all their friends or make a three-way call are unfamiliar tasks. Younger generations are learning fast, but for the elderly this is a real challenge, and there have been many efforts to try to make it simpler and more intuitive or self-explanatory. Ideally, the solution would be an automaton, would work on its own, right out of the box.

Similarly, it is often the case that simplification of essential communication is also needed, such as for making a call for help. Dialing 911 requires a telephone within reach, a pair of free hands, and emergency dispatchers are often limited in the kinds of help they can supply. Relaying the call to AAA® for example, in the event of a flat tire or dead battery, something that is not a collision in need of a police officer, is not what emergency dispatchers do. Similarly, they will dispatch an ambulance, but they will not place a call to your doctor.

Other older systems are either more expensive or more difficult to set up. The new household digital assistants such as Google's HOME or Amazon's ECHO are not portable, are costly and require an expensive monthly fee to remain active. What is needed is a fifteen-dollar device that is either preset to perform a task in response to a simple command, or provides the user a simple choice to select a customizable function, and can be taken anywhere. For finding things, most of these older systems require a willingness to wrestle with a user interface on a smart device so that everything is set up in memory and all the radios are connected. Again what is needed is a simple system that allows the user to simply position a tiny device or attach one to an item of interest, and then verbalize the magic words to make it work. Presto!

Also of interest to consumers is the capacity to find a whole set of several essential things, such as having all the paraphernalia needed to go out in public, including a purse or wallet, perhaps a keychain with the house key, a smartphone, a pair of glasses, an umbrella, a hat, a grocery list, and so forth. Thus the object of this need is a simple and inexpensive system having tags for multiple items and an "Internet for Dummies" device that can respond to a simple question, "Have I got everything", by causing any device that is outside of reach to announce itself. What would be truly surprising and unexpected is that the user who has found any one essential thing, such as the keychain, can use that device to say the magic words and then expect the system to conjure up an announcement by each of the tracking devices on the list until all the essential things are within the user's reach. For those with Alzheimer's Disease, early dementia, absent-mindedness, hyperactivity, attention disorder, or any kind of limited mental capacity, the problem of picking up and taking everything needed for a trip to the store should be as simple as finding the doorknob.

Making complex systems simple is not usually simple to do. Mastering the skills of internet connectivity, multiple kinds of radio networks, and applying those skills to problems of ordinary living requires a special kind of creativity. Then, when a possible solution emerges and is put into practice, discovering unexpected benefits that had not been intended, is the science of emergent properties of systems, a new and fruitful science that relates to unintended consequences. These and other benefits of the systems of the invention are described here in more detail in the sections below.

SUMMARY

Disclosed is a miniature and portable hands-free device that helps people find their personal items, either acoustically when in close range, or using a radio beacon approach. Also disclosed are methods for its use as part of a system. Disclosure is also made of a miniature and portable hands-free device that helps people with simple but important communications and functions as an automaton.

Devices of the invention are voice-activated and are designed to limit actuation by other sounds. The devices are small, pocket-sized, smaller than an OREO® cookie, and may be as small as a pinto bean, and can operate for months on a single charge. Thus they are readily adapted to become a constant companion of the user by fitting in a pocket, attaching to a keychain, clipping on a shirt or hat, or adhesively or magnetically being applied to a surface such as refrigerator, nightstand, or a windshield. Voice actuation is accomplished by converting the sound pressure of a two-part code phrase vocalization into an electronic pulse that turns on a digital signal processor (DSP) chip. The DSP will verify the code phrase, determine the particular object that the user is looking for by the second part of the code phrase, and if that matches the device programming, a location display will be initiated, generally as an audio or visual display. The device works right out of the box with no setup and hence is advantageous for individuals not interested in programming the device.

In a more advanced design, the devices are portable radio beacons, termed here "radiotag finders", and generally have a bluetooth radio set in a chip (termed here a "core"). The device may also have a cellular radioset in a chip, the cellular radioset with greater range and power than a Bluetooth radio, and made possible in portable devices by innovative control of power consumption. These radiotag finders are portable and inconspicuous, and include a one or plurality of microphones and a digital signal processor with audio filters and voice signature recognition capacity, a limited memory for storing the voice signature to be detected, a portable power supply (generally a battery), and a limited processor capacity for performing the simple instructions needed to detect the voice signature and actuate a location display, typically via at least one of an LED, a speaker or a vibrator. Generally, the response will have a short duration, but may be re-actuated any number of times as needed to find the object to which it is attached or to get a notification to an outside party who can respond as needed. The filters are bandpass filters, and are configured to limit the sound passed to the DSP to sounds in the frequency range associated with use of words to convey meaning in normal human speech. Typically this is in the range of 65 to 260 Hz for male speakers and 100 to 525 Hz for female and child speakers. This defines a "voice band" having frequencies in the range of 60 to 525 Hz. While vocalizations may include frequencies up to and greater than 5 or 6 kHz, sounds greater than about 600 Hz generally are not needed to recognize words and phrases. The bandpass filter will reject sounds having higher or lower frequencies outside the voice band.

Preferred embodiments of the finder include a logic circuit is operative in processing in sensory input from the microphones and is configured to recognize one or more code words or phrases. The logic circuit is operative in processing in sensory input from the microphones and is configured to recognize a "find X" phrase and a "stop" phrase, where X is a host object. This feature is used in a local area defined by the distance of travel of a voice when speech is distinct and not in a raised voice, and hence is dependent on a certain level of quiet from outside sounds. By configuring the microphone array, noise cancelling logic may be used to reduce interference of background noises, but conditions must be such that a voice can be recognized. Where conditions are not suitable for voice detection and code word or phrase recognition, a wireless beacon may be included in the finder so that detection may be accomplished using a hub, a smart device, or a cloud host as described in our earlier patent and patent application disclosures.

In a preferred embodiment, the invention is a voice finder, which comprises (a) a portable housing having an external casing attachable to a host object; (b) wherein the casing encloses i) a piezoelectric microphone configured to supply an electrical pulse and an electrical signal when stimulated by a vocalization having the frequency of a human voice; ii) a digital signal processor with pattern matching capacity and logic circuitry, wherein the digital signal processor is configured to awake from a low power sleep mode in response to the electrical pulse from the piezoelectric microphone, to recognize a code phrase vocalization in the electrical signal, the electrical signal having an attention segment followed by an object definition segment, and wherein the digital signal processor is configured with logic circuitry to output a validation signal that the code phrase vocalization has been matched; and, iii) a notification circuit having one or more display devices configured to make a display, wherein the notification circuit receives a validation signal from the digital signal processor. Optional sensors may also be incorporated. So as to conserve power, the digital signal processor is configured to enter a sleep mode in response to a sleep word or phrase receivable by the microphone and recognizable as a sleep word or phrase by the digital signal processor. The sleep word acts to shut down power consumption by display devices and logic circuitry of the finder.

Wake up is a two stage process. In a first low power mode, only the microphone and bandpass filter is active. When a human voice is detected, the microphone outputs an electrical pulse that wakes up the digital signal processor. However, the circuitry remains in low power mode unless a wake word, also termed here an "attention segment", is detected. While in low power mode, the digital signal processor then performs pattern matching on a full electrical signal received from the microphone and identifies an object definition segment of the signal that is associated with a particular species of host object that is the subject of the search. If there is a match, then the finder will engage a notification circuit and display devices so that the user can locate the source of the distinctive audio or visual display.

Typically display devices are selected from visual or audio display devices that may be used in combination or singly, but may also include tactile devices and where operated with a hub or control system, may be a radio signal acting as an intermediary in generating a display.

The casing may include a multifunction button configured to test the notification circuit or to silence the display device or devices. Typically the button or switch is enabled to put the digital signal processor to sleep. The logic circuitry is enabled to initiate an audio or an audio and visual display in response to one or more code words or phrases from the electrical signal.

The digital signal processor may be configured to recognize and validate a "FIND X" phrase and a generic "STOP" phrase, wherein "X" refers to a host object, and the logic circuitry is operative to place the finder in a power saving sleep mode when a generic STOP phrase is recognized and validated. The casing may be labelled with one or more indicia that identify a species of "FIND X" code phrase that the logic circuitry enclosed in the casing is configured to detect; wherein the indicia define a finder species. The "FIND X" code phrase is analyzed by the logic circuitry as a first segment having a tonal value that defines a generic wake up word and a second object definition segment having a tonal value that defines the finder according to the finder species.

The finders may be provided as kits having a plurality of finder species. Kits may include one or more customizable finder devices not defined by indicia characteristic of a finder species, and instead the customizable finder devices are programmable to store in memory and do pattern matching on a "FIND X" phrase from a user. In other instances, the logic circuitry is programmed with a plurality of "FIND X" phrases that can be validated by the digital signal processor.

Generally, the casing is pocket-sized or smaller, and the logic circuitry comprises an accelerometric sensor. The accelerometric detector may function to assist in finding a host object.

But in some embodiments, the device casing is embedded as part of, inside of, or is permanently affixed to a host object and encloses a piezoelectric microphone configured to supply an electrical pulse and an electrical signal when stimulated by a vocalization having the frequency of a human voice; a digital signal processor with pattern matching capacity and logic circuitry, wherein the digital signal processor is configured to awake from a sleep mode in response to the electrical pulse from the piezoelectric microphone, to recognize a code phrase vocalization in the electrical signal, the electrical signal having an attention segment followed by an object definition segment, and to output a validation signal that the code phrase vocalization has been matched; and, a notification circuit having one or more display devices configured to make a display, wherein the notification circuit receives a validation signal from the digital signal processor.

The finders may be attached to host objects selected from key fob, remote controller, wallet, emergency road kit, emergency first aid kit, prescription medication organizer, spare battery pack, smart device, briefcase, and so forth. The device is generally pocket-sized and portable, running on battery power, and may be as small as a bean, and in other embodiments may include a functional accelerometric sensor, or a gyroscope, a compass, or even a GPS sensor if suitable power storage density can be achieved. By configuring the finder to be asleep until woken up, the device is capable of extended use on battery alone and is thus highly portable.

To conserve power, the finder may also recognize a hibernate or "sleep" phrase configured to stop the display signal when a stop command is detected by the logic circuit in sensory input from the microphones.

In another embodiment, a radiotag tracker-finder will include a notification system having an LED; a speaker or buzzer; a vibrator; a radio beacon; or a combination of the above notification systems. The radiotag finder is generally capable of generating one or more signal or signals selected from a light; an audible sound; a vibration; a radiobeacon broadcast detectable by a smart device or hub; or a combination of the above signals, and further wherein the finder device is powered to repeat the signal or signals until a host object attached to the finder is found. When the radiotag finder-tracker is operated as a radiobeacon, the signal received from the radiotag is received by a hub or a smart device and in response a signal is sent back to the radiotag with a command to make an audio or an audio and visual display.

The finder in another embodiment may include a multifunction button or switch accessible through the casing. The multifunction button is generally configured to test the notification system and to silence the notification system.

The invention may also be defined by a family of host objects in which a finder is embedded inside or permanently affixed to the host object. Examples of host objects that can be served by the invention include key fob, remote controller, wallet, emergency road kit, emergency first aid kit, prescription medication organizer, spare battery pack, smart device, briefcase, for example. Thus the remote control may include an embedded radiotag of the invention, and so forth. The finders and radiotag finders may be supplied as kits including a plurality of devices, each device capable of recognizing at least one of a particular pre-programmed or programmable object definition segment having a tonal value that is pattern matched and validated to activate a display device within the finder, thereby assisting the user in locating the finder and the attached host object.

In other embodiments, the invention is a method of finding or tracking one or more host objects. The steps of the method may include: a) providing a voice finder to a user, wherein the finder is configured to detect a code word or phrase "FIND X" when spoken in proximity thereto; b) attaching the finder to a host object defined by a name "X"; c) without any setup, speaking the code word or phrase "FIND X"; thereby actuating logic circuitry in the finder to wake up and triggering a notification system to initiate an audio or visual display; d) displaying the audio or visual display until the host object is found; and, e) speaking a stop word or pressing a button to stop the display and cause the finder to enter a sleep state having low power consumption.

In addition, the method can include: a) providing a radiotag finder to a user, wherein the radiotag finder is configured to detect a word or phrase "find X" when spoken in proximity thereto; b) attaching the finder to a host object having a name detectable when a phrase "find X" is spoken in proximity thereto; c) speaking the phrase "find X"; thereby actuating logic circuitry in the finder to wake up and trigger the notification system to initiate a radio signal; and, d) rebroadcasting the signal at defined intervals as a bluetoothed radio beacon signal, the signal having a signal strength; and, e) using a smart device to locate the host object by a process of moving and pointing the smart device so as to maximize the signal strength. Radio methods may also include a) providing a radiotag finder to a user, the radiotag finder having logic circuitry, a digital signal processor, logic circuitry, a radioset, a notification circuit with display device, a battery and an accelerometric sensor, wherein the radiotag finder is configured to detect a word or phrase "FIND X", where X is a host object, when spoken in proximity thereto or to detect a radio signal from a control device commanding the radiotag finder to actuate the display device when the signal matches a defined command to find X; b) attaching the finder to the host object X; c) programming the finder to send a beacon signal containing a radio identifier and accelerometry data to a control device; d) rebroadcasting the beacon signal at defined intervals as a bluetoothed radio beacon signal, the signal having a signal strength; e) using a control device to locate the host object by a process of moving and pointing the smart device so as to maximize the signal strength or by speaking the phrase "FIND X"; thereby actuating logic circuitry in the finder to wake up and trigger the notification circuit with display device to initiate an audio or an audio and visual display. Alternate methods include using a control device (also termed a "smart device" configured to operate an application) to locate the host object by a process of querying a cloud host or hub so as to locate the host object; and, when in proximity thereto; speaking the phrase "FIND X"; thereby actuating logic circuitry in said finder, and waking up and triggering the notification system to initiate an audio or an audio and visual display. The radiotags may also include a cellular radioset with the radiotag tracker-finder and may involve using a control device as a radio locator over long distances (via cellular networks) in combination with a vocalization of a FIND X code word or phrase, so as to find the host object with a minimum of battery usage. These radiotag tracker-finders may include a radio for making Bluetooth or cellular radio broadcasts, or may include a transceiver to sending and receiving messages. The radiotag finders may have greater range and may be operated in conjunction with a smart device, a hub or an internet portal to activate sophisticated tracking routines while the same device retains function as simple finder with voice actuation.

The elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which:

FIG. 5 illustrates a method of use for a basic finder. The owner, upon realizing that a keychain has been misplaced, need only state "FIND KEY", and the finder attached to the keys will respond by announcing its presence, as shown here under a pillow on the couch.

FIG. 18 describes a method for using a "GET HELP" device.

FIG. 21 illustrates key features of a Bluetooth ad hoc "scatternet" mesh network.

Figure 1:
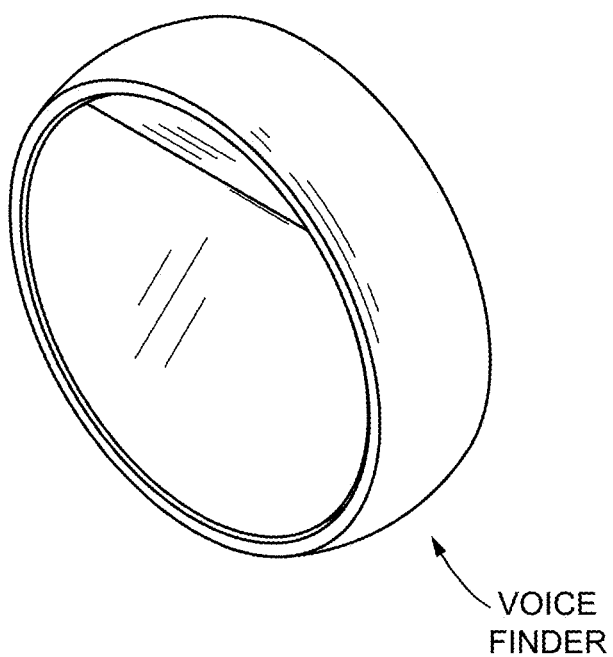
FIG. 1 is a view of a voice-actuated finder device as a first embodiment of the invention.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

GLOSSARY

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

General connection terms including, but not limited to "connected," "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can,'" and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

"Computer" means a virtual or physical computing machine that accepts information in digital or similar form and manipulates it for a specific result based on a sequence of instructions. "Computing machine" is used in a broad sense, and may include logic circuitry having a processor, programmable memory or firmware, random access memory, and generally one or more ports to I/O beacons such as a graphical user interface, a pointer, a keypad, a sensor, imaging circuitry, a radio or wired communications link, and so forth. One or more processors may be integrated into the display, sensor and communications modules of an apparatus of the invention, and may communicate with other microprocessors or with a network via wireless or wired connections known to those skilled in the art. Processors are generally supported by static (programmable) and dynamic memory, a timing clock or clocks, and digital input and outputs as well as one or more communications protocols. Computers are frequently formed into networks, and networks of computers may be referred to here by the term "computing machine." In one instance, informal internet networks known in the art as "cloud computing" may be functionally equivalent computing machines, for example.

"Computing machine" is used in a broad sense, indicating a machine that accepts information in digital or similar form and manipulates it for a specific result based on a sequence of instructions. The computing machine may include logic circuitry having a processor, programmable memory or firmware, random access memory, and generally one or more ports to I/O devices including one or more of a graphical user interface, a display, a pointer, a keypad, a sensor, imaging circuitry, a radio or wired communications link, and so forth. One or more processors may be integrated into the display, sensor and communications modules of a monitoring system of the invention, and may communicate with other microprocessors or with a network via wireless or wired connections known to those skilled in the art. Processors are generally supported by static (programmable) and dynamic memory, a timing clock or clocks, and digital input and outputs as well as one or more communications protocols. Computing machines are frequently formed into networks, and networks of computers may be referred to here as "a computing machine". In one instance, ad hoc internet networks known in the art as "cloud computing" may be functionally equivalent to a distributed computing machine, for example.

A "server" refers to a software engine or a computing machine on which that software engine runs, and provides a service or services to a client software program running on the same computer or on other computers distributed over a network. A client software program typically provides a user interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud.

"Processor" refers to a digital beacon that accepts information in digital form and manipulates it for a specific result based on a sequence of programmed instructions. Processors are used as parts of digital circuits generally including a clock, random access memory and non-volatile memory (containing programming instructions), and may interface with other digital beacons or with analog beacons through I/O ports, for example.

"Batteries" or "cells"—include "primary batteries" selected from a zinc/manganese dioxide cell, a Leclanche cell, a zinc/potassium hydroxide cell, an alkaline cell, a zinc/mercuric oxide cell, a cadmium/mercuric oxide cell, a zinc/oxygen cell, an aluminum/air cell, a lithium cell, a lithium/liquid cathode cell, a lithium/solid cathode cell, a lithium/solid electrolyte cell, a lithium-ion cell, a lithium-polymer cell, or a lithium/iron cell. Batteries are also defined by the terms a "secondary" battery and a "rechargeable" battery. Rechargeable batteries may be selected from lead-acid cells, cadmium/nickel cells, a NiCad cell, a hydrogen/nickel oxyhydride cell, a nickel/metal hydride cell, an NiMH cell, a sodium/sulfur cell, a nickel/sodium cell, a magnesium/titanium cell, a magnesium/lithium cell, an alkaline manganese cell, a nickel/zinc cell, an iron/nickel cell, an iron/oxygen cell, an iron/silver cell, or a redox cell more generally. The term battery may also be extended to include a supercapacitor. More detail is supplied at http://www.powerstream.com-/BatteryFAQ.html#ac, accessed in November, 2015.

"Radiotag"—is understood in this disclosure as a solid-state device having only a transmit radio function, firmware to support pre-defined encoded pulse transmissions, a clock, and generally a voltage sensor or comparator function. The radiotags of the invention also include contacts having a form factor configured to make an electrical connection with a battery and are thus each specific to a particular species of battery. The transmission is generally structured as an intermittent pulse, and encodes at least one unique identifier signal associated with each individual beacon and at least one identifier associated with a particular class of beacons, such as radiotags associated with a particular function or host system. The number of possible identifiers is dependent on the structure of the pulse. Unique device identifiers may be 32-bit words for example; class identifiers may be UUID signals, for example.

A local private cluster (LPC)—is a cluster of radiotags in proximity (at least periodically) to one or more radio receivers having at least a limited capacity to process programmable instructions and to broadcast or display an alert when an emission from a radiotag in the cluster is detected. If the radio receiver is mobile, the network may be established when the receiver comes into proximity to a radiotag that is emitting a signal. Because the radiotag emissions are unidirectional (no on-board receiver is used) and is intermittent (to save power), the LPC is not a network in a conventional sense of the word. In another sense, radiotags of a local private cluster communicate with a larger network of computing machines via unidirectional radio pulses and are not radio receivers.

A "hub"—is defined as a computing device having a capacity to detect a pulse emission from a plurality of radiotags and is generally positioned in proximity to a local private cluster. The hub may "host" a local private cluster of radiotags. The hub includes a radio receiver, a processor, a memory component, and program instructions configured to detect pulse emissions and to activate an alert display or broadcast an alert message when a radiotag emission from the local private cluster is detected. Generally the hub has the components of a computing machine and may include wired and wireless communication functions. In this way, LPCs may be shared with multiple users and meta-networks may be joined, such as through an internet gateway, a local area network, or a wide area network.

Broadcasts are termed "messages"—because they preferredly include a "data payload" having output from a sensor or sensor package associated with the radiotag.

"Cloud host" or "cloud host server"—refers to a cloud-based computing machine having rules based decision authority to make notifications according to a message data payload received from a user. In some instances the cloud host may also cause machines to execute actions based on program rules. In this document, a symbol depicting a cloud and the reference number 100 are metaphors for the Internet itself, for local area networks (LANs), for wide area networks, and for individual sites on the Internet where users may access cloud computing, and store and retrieve programs and data.

"Five by five"—a radio term describing a very good quality of clarity of a radio transmission.

"Local area"—is a term descriptive of radio reception within a range of about 300 ft from a broadcast origin, and indicates a "low energy radio" source, such as a source, as currently practiced, that meets a Bluetooth low energy radiotag (BTLE) standard. Bluetooth standard channels are generally in the 2.4 GHz frequency band (2.412-2.472 GHz) and/or the 5 GHz frequency band (5.180-5.825 GHz). WLAN IEEE 802.11b/g, IEEE 802.11a and IEEE 802.11n protocols define radios that are compatible, but other related ISM bands may be used to avoid interferences or overlapping channels if desired by modifying the radiotags and receivers accordingly.

"Sensors", broadly, may sensing devices for temperature, light intensity, smoke, voltage, sound, motion, displacement, acceleration, humidity, temperature, pressure, radiation, button-press stimulus event, open switch event, compass direction, proximity, GPS position determinations or raw satellite data, radio traffic density, detection of compatible devices within radio range, or other stimuli or sensor data, for example, and is more generally termed "contextual content", while not limited thereto. According to relationships and permissions established by the receiving device and/or network system, look-up results are processed to configure notifications tied to the contextual content of the broadcast. Notifications to a receiving device and/or system are configured according to contextual data (sensu lato) broadcast by the beacon and known to the system.

DETAILED DESCRIPTION

FIG. 1 is a view of a voice-actuated finder device as a first embodiment of the invention. The finder device is a voice activated device effective in locating objects and also may be fitted with wireless technology for finding and tracking objects when used with a smartphone or other computerized Internet portal. The body may be the size of a ring as shown here, or a domino, a pea, a miniature tile, a pencil eraser, or a breadcrumb, and also may be built into or embedded in or on an object in need of tracking. Increasing miniaturization is possible because of its low power requirements which can be satisfied by disposable or rechargeable batteries having lifetimes after a single charge of a year or more.

Essentially, it is an Internet of Things (TOT) device, but with a twist. Unlike the internet devices conceived as a global network of interconnected radiosets, the radiotags of this first embodiment are voice actuated and perform their defined function by a defined voice command—one command, one response. Each voice command is directed at an individual device and only the individual device will respond in an easily observed way. The device may include a speaker or an LED and will emit a display that is audible, tactile or visible, or a combination of display modes, when it is called by a voice.

A digital signal processor chip (DSP) is used to convert a simple phrase into a computer recognizable string of 1's and 0's that encode a key, the key for actuating a preprogrammed response. The device will typically have one or more microphones for picking up and digitizing the analog sound of speech reciting a simple phrase and reliably break the phrase sounds down into a simplified key that opens the processor. The DSP can recognize the phrase even if there are differences in different speaker's voices, even if the speaker has a bad cold, or even if the speaker's voice is muffled or muddled by background noise. Typically, the code phrase will include an attention segment that is generic and actuates the DSP and a second object definition segment that defines the object that is being located. Each segment is a tonal value that can pass through a voice bandpass filter and be recognized by pattern matching that occurs in the DSP chip with associated logic circuitry. To illustrate, the code phrase "FIND X" is analyzed as a generic attention segment "FIND" and an object definition segment "X", where X is the name of the host object to which the finder tag is attached. "FIND KEYS" thus would be addressed to the finder tag attached to a keychain, for example.

Figure 2:
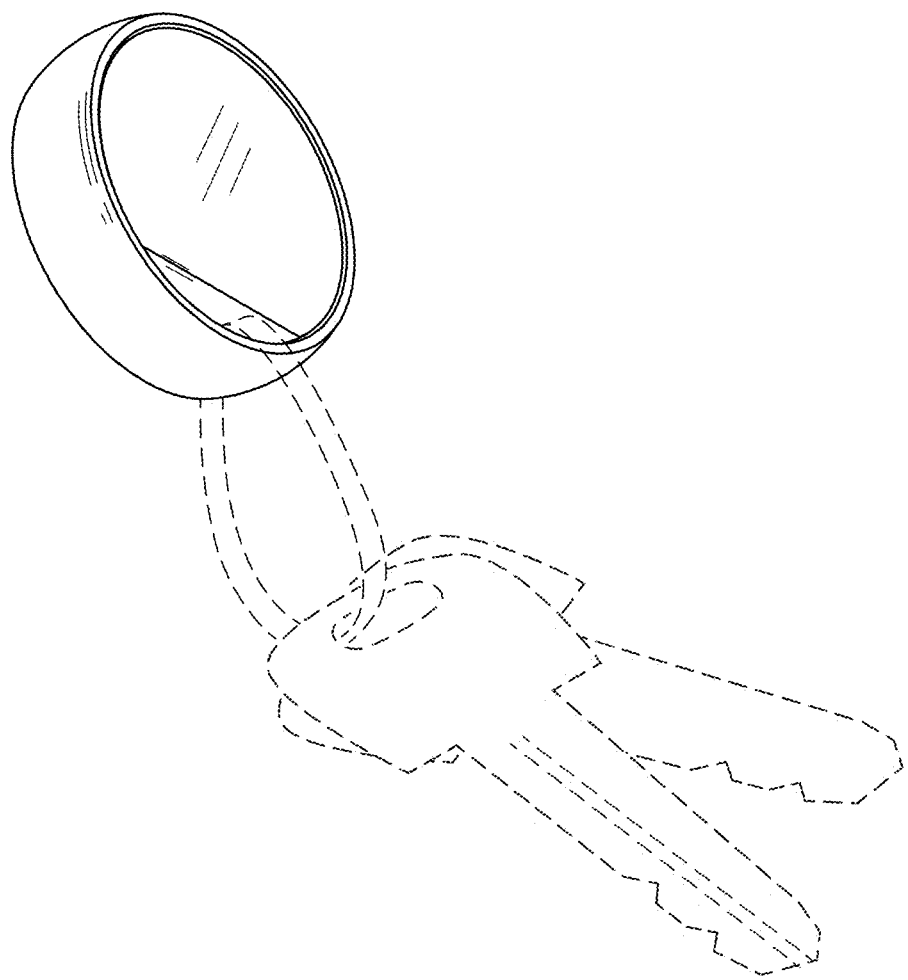
FIG. 2 shows a voice-actuated finder device attached to a set of keys, as an example of the invention in a typical context of use.

FIG. 2 shows a voice-actuated radiotag finder device attached to a set of keys, as an example of the invention in a typical context of use. This combination allows the keys to be readily found even if they are covered by papers or have been left in a pocket of a discarded jacket.

The voice-actuated finder device can include a casing (housing with internal cavity), a speaker or buzzer made from a resonant member and a resonance driver for making an audible signal that can be localized by a user, an LED for making a visual, often colored, display that the user can detect even in the darkness, an internal circuit compactly formed around a battery, a bluetoothed radioset with low energy antenna, a processor circuit (logic chip circuit) for configured for digital signal processing and other programmable functions, a sensor or sensors including a microphone for collecting sound, a filter for separating vocalizations from irrelevant surrounding sounds, and a multifunction button accessible through the housing.

One or more of these components is found in a basic model. Other components of the list or accessory to the list are found in alternative models. The logic chip circuit may be used in conjunction with memory that stores program instructions, or may be constructed with firmware designed to run dedicated functions. The logic chip circuit typically may include a processor or microcontroller with control and response functions as well as sensory processing functions, and may also include an accelerometer or a temperature sensor, for example. The microphone array typically connects directly to a digital signal processor (DSP) but may also include advanced signal filtering and conditioning circuitry. The DSP works with dedicated memory to "match" a signal reported by the microphone array according to rules embedded in the circuitry, including a digital signature of a "code phrase" stored in a memory. The signature may be configured so as to be generic, recognizing any voice saying a pre-defined code phrase or word, or may be individualized, recognizing only one voice, typically that of the owner of the finder.

Figure 3A:
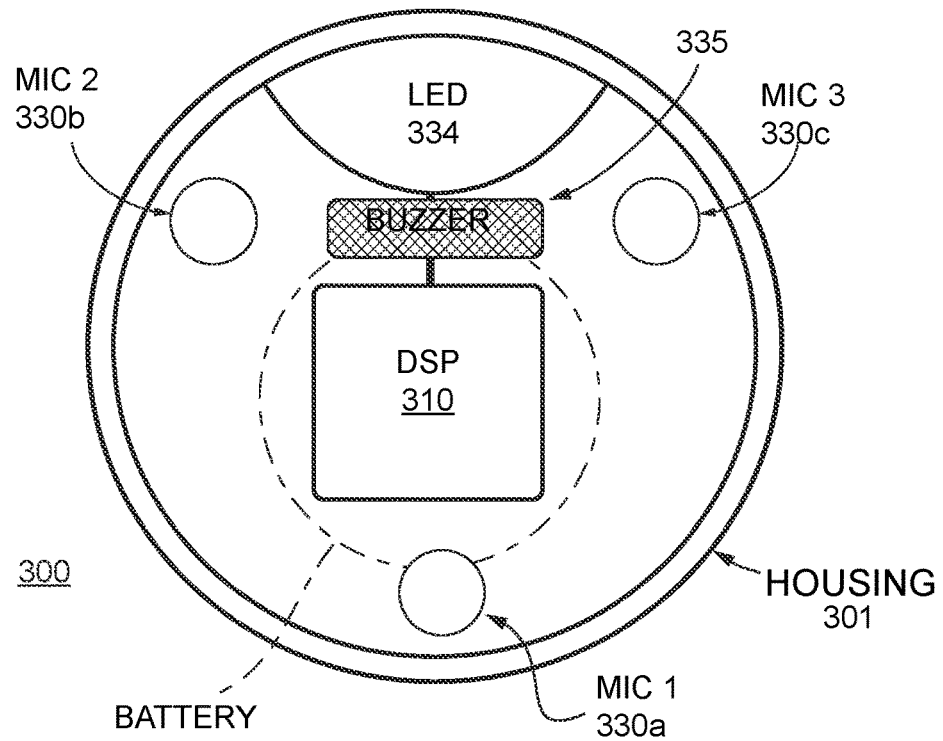
FIG. 3A is a schematic of a basic finder device 300 with digital signal processor (DSP) and minimal controller logic functions.

FIG. 3A is a schematic of a basic radiotag finder device 300 with digital signal processor (310, DSP), encoder and radioset, and a minimal processor in a single integrated chip. The three microphones 330a, 330b, 330c are used in an array as part of a signal noise cancellation circuit that aids in accuracy of voice recognition algorithms, but the DSP is not dependent on recognizing an individual's voice, rather a signature pattern in the code phrase ("code phrase") is recognized, so that any individual can use the device right out of the box with no setup or instruction. The device will typically include an LED 334 and a buzzer 335 in a sealed housing 301 containing a battery 302, the microphones, and the logic circuitry with any programming. The antenna is typically a low energy antenna imprinted on a circuit board or applied to an inside surface of the housing. A radio is not needed but is optional.

In some instances, finder devices comprise cache memory and are programmable to store in memory and do pattern matching on a "FIND X" code phrase where the "X" is customized by a user. These devices may include a switch to actuate a microphone record mode so that the desired code phrase can be loaded into the device by the user.

Figure 3B:
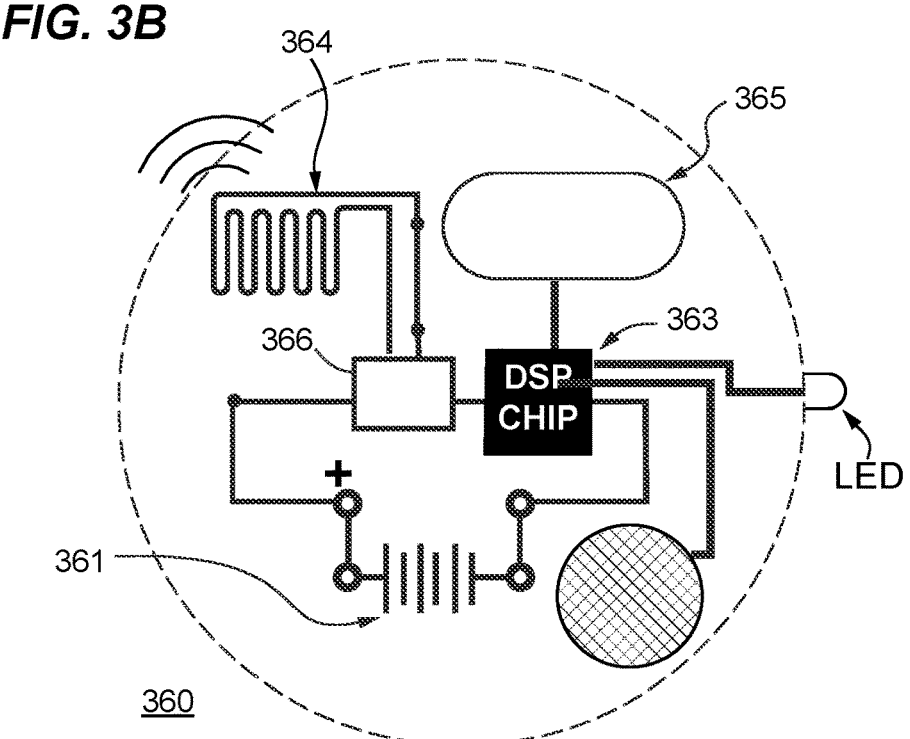
FIG. 3B is a partial schematic of a more advanced finder 360; showing a radio signal generator and wiring.

FIG. 3B is a partial schematic of an enhanced radiotag finder with internal battery and radiobeacon circuit that includes a DSP chip and a microphone. The circuit 360 includes a voltaic pile 361. The radiotag subcircuit is connected in parallel and includes a core DSP chip 363 (with filters, encoder and digital output of a processed analog input), a processor in the chip core, a radio signal encoder and generator 366 for generating an RF signal according to processor instructions, and an antenna 364 for broadcasting the RF signal, generally at a defined frequency. In this example, the microphone 365 may be a piezoelectric microphone or an electret microphone. The microphone is configured to wake up the DSP chip by generating an electric pulse when a sound pulse of an appropriate frequency hits the microphone. And not shown are peripheral display devices such as buzzer, speaker, vibrator, or an LED. The DSP chip may include a bandpass filter for capturing sounds of a human voice and may have sufficient processing power to actuate peripherals as well as identify code phrase signatures in the vocalizations. The DSP chip may also include basic processor function for controlling radiobeacon 366.

The radiotag signal includes the identification information that radiotags the radiotag device with a device identifier and a structured signal that may contain sensor data output. A program application in a monitoring device such as a hub or smart phone may be used to identify the signal by the device identifier in the broadcast and to deduce the location of the device from a look-up table set up by the user or from proximity data in real time.

Basic circuit components of a radiotag are identified. Circuit components include a core digital signal processing integrated circuit or "chip" 363. The chip generally includes an integrated microcontroller, read only memory (ROM), random access memory (RAM) sufficient to support audio signal processing from inputs provided by the three microphones, and may be provided with firmware sufficient for basic functions, and generally includes a clock and at least one sensor, such as an IO port connected to a multifunction button mounted in the housing. The circuit may also include any kind of environmental sensor (not shown). For some applications, a removable flash memory device may be incorporated. The memory device may tabulate data collected by sensors mounted in the device for later retrieval and analysis. Messages received by the device may also be collected if the device includes a transceiver.

The device 360 is assigned a unique identification code (UUID) and will generally broadcast at periodic intervals as programmed by the developer. Broadcasts may be made using a ceramic antenna, a loop antenna, a whip antenna, a patch antenna, or a dipole antenna selected for low energy consumption such that the antenna is disposed in radiolucent battery housing.

The device 360 also may be connected to one or more sensors, including a variety of sensor types. Exemplary sensors detect or quantify environmental and physical parameters experienced by the radiotag, including and not limited to temperature, light intensity, smoke, voltage, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery threshold level, other stimulus, sensor data, or environmental parameters, without limitation thereto. In some embodiments, a sensor is a combined multi-axis motion sensor and temperature sensor. In one embodiment, the sensor has an accelerometer, a gyroscope, and a magnetometer for each axis. The information or "sensor data" output by the accelerometer and gyroscope enables the receiver (i.e., a control device such as a smartphone) to monitor and find or track as it moves from one location to another. Alternatively, the radiotag may include a GPS-based location sensor. The motion of the device can be monitored continuously by a cloud host server as long as the receiver is close enough to be in wireless contact with the sensor package on board or alternatively with a radiotag in wireless contact with the beacon. As an alternative, the information may be stored in a memory in the device and accessed later. Earlier work on such systems that is commonly owned includes U.S. Pat. Ser. No. 14/820,475 filed 6 Aug. 2015, Ser. No. 14/301,236 filed 10 Jun. 2014, Ser. Nos. 14/301,213 and 14/820,393 filed 6 Aug. 2015, and Ser. No. 15/072,699 filed 17 Mar. 2016, all said patents and patent applications being incorporated here in full for all purposes.

Use of voice actuation as in basic device 300 is a preferred method for operating a simple finder in a local environment. Accessory use of more complex radiobeaconing finder techniques is optional but has advantages if a device as illustrated by radiotag finder 360 is carried outside a well-defined territory and local area.

In some embodiments, the voice finder 360 can be embedded in or as part of a host object or may be permanently attached to the host object. Thus for example a television remote control, a knife, or a flashlight can be supplied with a finder having a "FIND X" voice finder capability.

If the radiotag is a hybrid system (referencing U.S. Prov. Pat. No. 62/732,945) having both Bluetooth and cellular radiosets, then location may be determined by triangulation of a cellular signal, or by AGPS, for example. Inferences from radio proximity to transmitters having known locations and by borrowing the location information from the smart device are also useful for determining a location. The location information can be transmitted to a cloud host for later reference, such as in the tracking system as described in FIG. 15.

As a surprising event that would not have been expected based on the finder requirements, the user will discover that, when on a dark street trying to pick up a keychain dropped in the dark, by voicing the code phrase, "FIND KEY", surprisingly the LED in the finder device goes on, allowing the user to pick up the keychain and position the key in the doorlock. Devices capable of recognizing a single phrase may also be capable of recognizing multiple phrases and may include a limited ROM and cache memory capacity so as to be programmable. DSP chips are commonly firmware devices but may also include some programmable capacities.

Figure 4A:
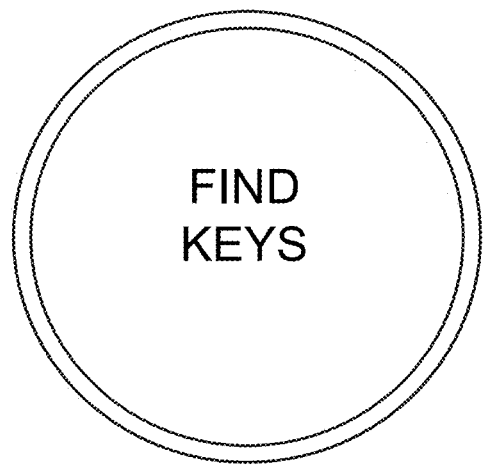
FIGS. 4A, 4B and 4C are views of finders encoded with specific code phrases for use in finding particular objects.
Figure 4B:
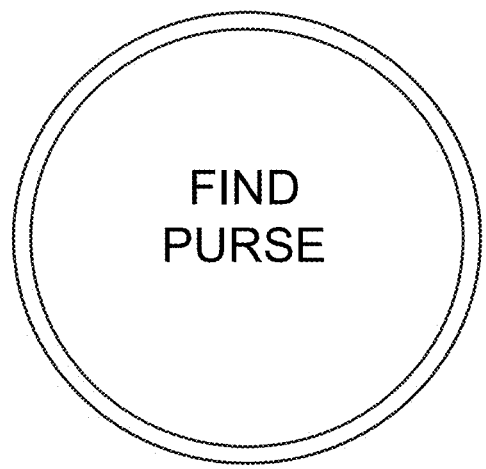
Figure 4C:
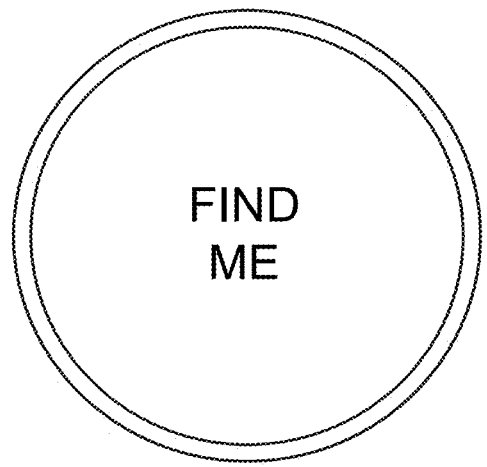

FIGS. 4A, 4B and 4C are views of finders encoded and labelled with specific code phrases for use in finding particular objects. These work as labelled directly out of the box, and may be provided as a "kit" of three or more so that users with limited or no computer skills can readily find commonly lost or misplaced objects around the house or yard. The kit would include a series of radio devices pre-printed with an indelible label and programmed to recognize the alert phrase printed on the label. By having several of these for the kinds of things the person feels are most likely to be misplaced or to be in need of tracking, the kit provides an instant solution for accessing a personal advantage of using the IOT. Examples include a device labelled, "FIND KEYS". And others labelled "FIND PURSE" or "FIND ME". Find me allows the user to associate the device with something personal so that it takes on the association given to it by the user. Some users for example might wish to have a device for finding a TV Remote Control and use the "FIND ME" device to serve that purpose.

Use of the word "FIND" as an actuator is not accidental. The fricative of the enunciation ends in a stop at the "d", where there is a touching of the tongue to the top of the mouth behind the teeth followed by the release of the air, which produces very characteristic pop of sound followed by a glottal stop before naming the object "KEYS".

And then the "K" sound is a velar consonant, where the tongue is pulled back toward the lower side of the velum (soft palate) in the back of the throat and air is allowed to rush through under control of the diaphragm. Another good actuator word is "GET SOME". The hiss actuates a particular pattern when it dissolves to the low frequency "om" sound. It can be used as will be described below.

FIG. 5 illustrates a method of use for a basic finder. The owner, upon realizing that a keychain has been misplaced, need only say out loud, "FIND KEYS", and the finder attached to the keys will respond by announcing its presence, emitting a signal such as a musical audio snippet, as shown here by a muffled musical sound coming from under a pillow on the couch. The owner, having found the missing item, can stop the signal by voicing a stop command, or by pressing an optional multifunction button 1015 on the finder (see FIG. 10). In this instance, the voice recognition system is built into the device. Alternatively, voice recognition could be a function of a "hub" strategically located in a household so that the hub recognizes the key verbal search phrase and sends a radio signal addressed to the particular device 360 called out. The device then goes into an alarm state, emitting a signal that can be used to find it even if covered under other materials.

Figure 6:
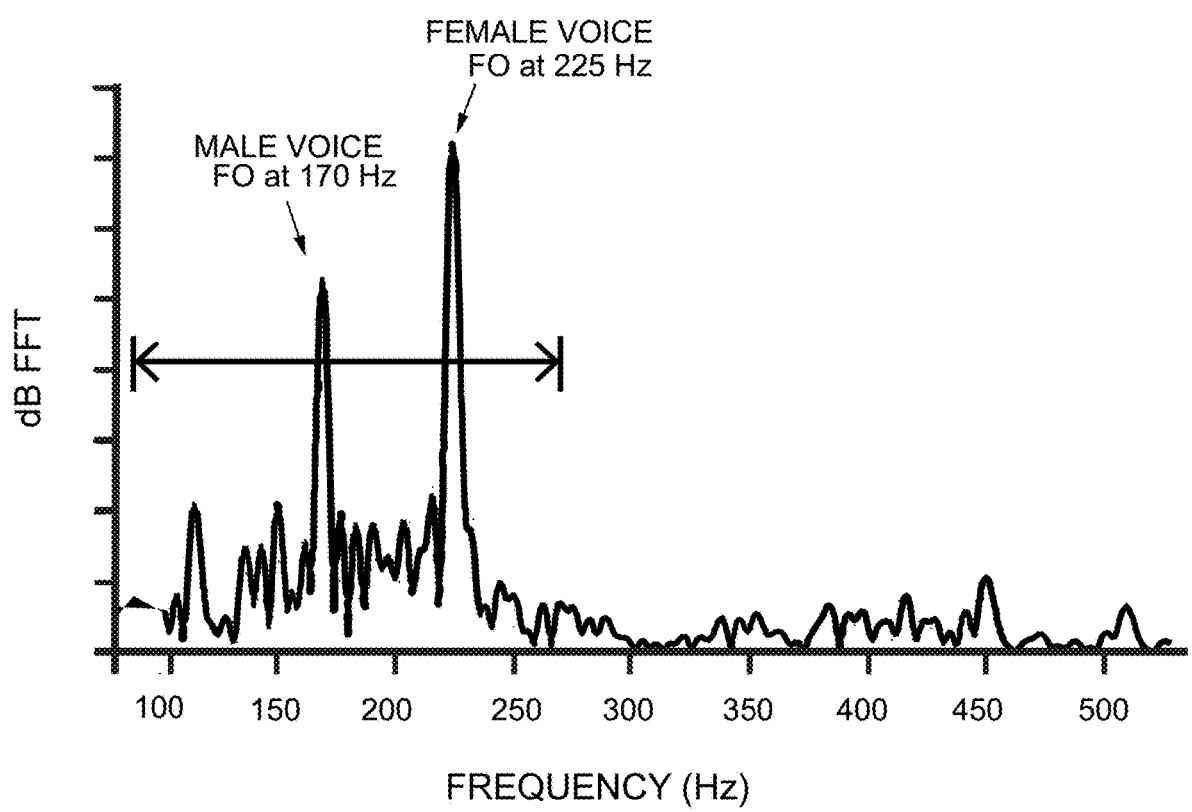
FIG. 6 shows a processed voice signal by frequency.

FIG. 6 shows a processed voice signal by frequency. The relevant "voice band" is about 65-525 Hz, more preferably about 80-235 Hz. There are different fundamental frequencies for male and female speakers, but the DSP recognizes shifts in frequency and harmonics more than the actual frequency or an FFT of the frequency. Harmonics are inherent in the sound. The speaker will change the harmonics present in the sound by changing the shape of the vocal folds and therefore the pitch being created. More closure in the vocal folds will create stronger, higher harmonics. The air inside the vocal tract vibrates at different pitches depending on its size and shape of vocal cord and larynx opening. The change in pitches are analyzed as formants. Formants filter the original sound source. The speaker will change the formants as words are articulated by changing the size and shape of the vocal tract. After formants and harmonics are generated, some become louder and some become softer as dampened by the tongue and by resonance chambers. So the changes in volume that indicate emphasis also appear as differences in a digital signature associated with the code phrase.

The electronic filters in the circuit are bandpass filters, and are configured to cut out background sound and limit the sound passed to the DSP to sounds in the frequency range associated with use of words to convey meaning in normal human speech. Typically, this is in the range of 65 to 260 Hz for male speakers and 100 to 525 Hz for female and child speakers. While vocalizations may include frequencies up to and greater than 5 or 6 kHz, sounds greater than about 500 Hz generally are not needed to recognize words and phrases. The bandpass filter will reject sounds having higher or lower frequencies outside the voice band.

In another instance, the audio signal can be digitized as a binary file and processed locally or processed by a cloud host, allowing for more complex interactions as improved speaker capacity is also built into the device for playing audio radio messages from the central cloud host or from a smart device.

Figure 7:
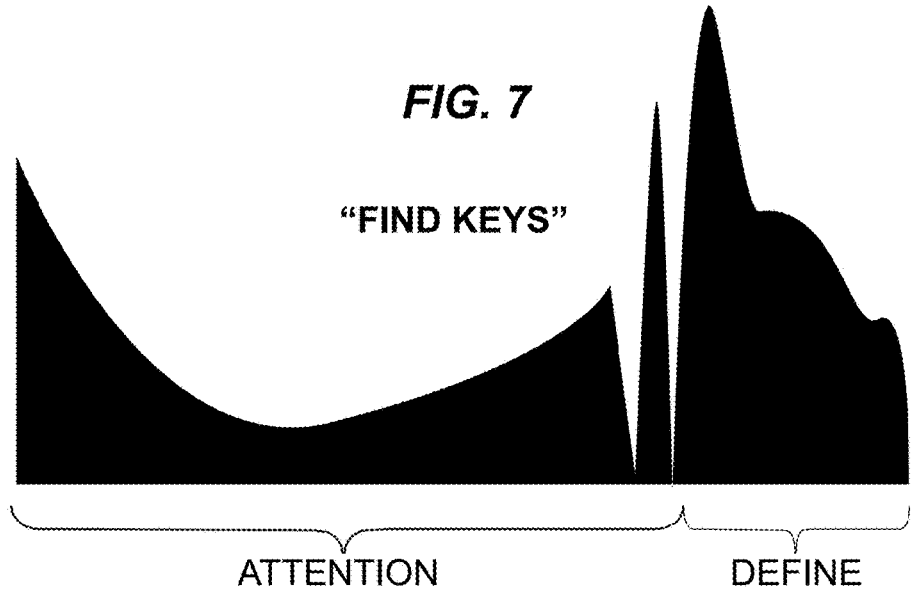
FIG. 7 is a schematic of a code phrase with amplitude and frequency as digitized by the DSP as a general indication of the kind of sound analysis and pattern matching that is done using the DSP chip and microphone array.

FIG. 7 is a schematic of a code phrase with amplitude and frequency as digitized by the DSP as a general indication of the kind of sound analysis and pattern matching that is done using the DSP chip and microphone array. A bandpass filter and other filters may be applied to remove noise interferences. The remaining signal can then be digitized and analyzed for a signature set of frequencies, rising or falling frequencies, hisses and glottal clicks characteristic of the code phrases.

Here shown for the phrase "FIND KEYS", the first part of the code phrase is a signal that is recognized as a precursor to a phrase that defines the object being sought. The first part of the code phrase is an attention phrase that wakes up the needed DSP chip functions. In the definition part of the signal, particular clues are digitized that can be looked up in a referential database to decode the name of the object being searched for. Because there generally is a limited list of objects associated with radiotags, the lookup process is relatively simple and can be done with a high level of accuracy.

The circuit generates a validation signal when there is a pattern match between the code phrase and the expected digital signature in the DSP memory. The process is one in which there is a piezoelectric microphone configured to supply an electrical pulse when stimulated by a vocalization having the frequency of a human voice; a digital signal processor with pattern matching capacity configured to recognize a code phrase vocalization having an attention segment followed by an object definition segment and to output a validation signal that the code phrase vocalization has been matched; and, a notification circuit having one or more display devices configured to make a display, wherein the notification circuit receives a validation signal from the digital signal processor, wherein the display devices are selected from visual or audio devices. The sound pulse received by the microphone generates the electrical pulse that wakes up the DSP, which is in a sleep mode until a signal that can pass through the bandpass filter is received from the microphone or microphones.

In this way, a single chip recognition program can recognize the code phrase no matter who speaks it, and thus the inventive finders can be used right out of the box with no hookup, no subscription, and no learning curve.

Figure 8:
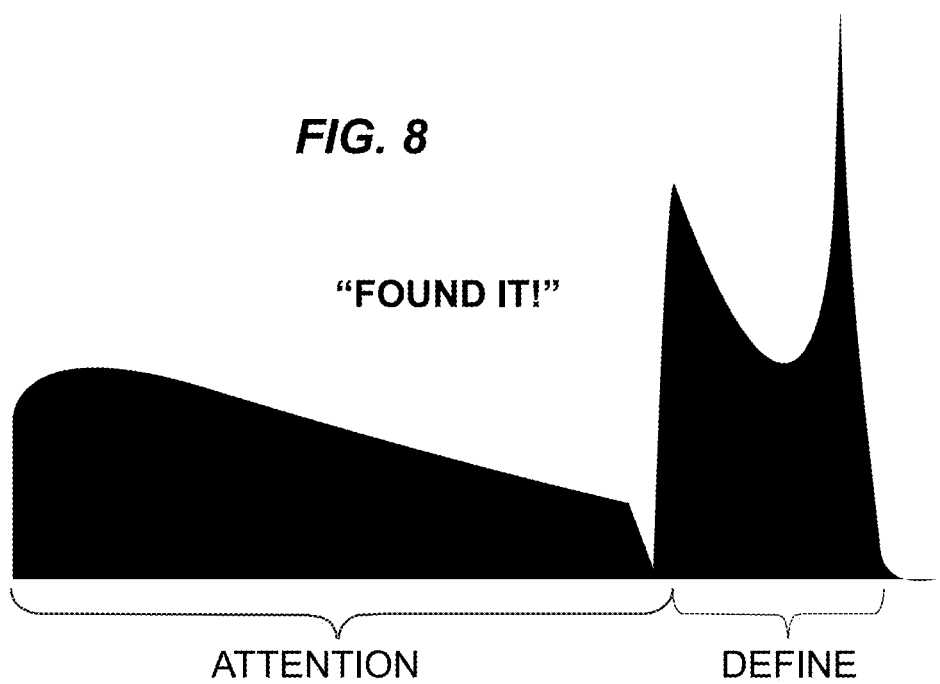
FIG. 8 is a sample digitization of amplitude and frequency for "found it" as an example of a "sleep word".

FIG. 8 is a sample digitization of amplitude and frequency for "found it". Another issue addressed by the invention is the need for a signal that turns off the notification when it is no longer needed. By holding up the device and speaking to it the words "FOUND IT" (as an example), the device can execute an instruction to stop its signal output and return to a sleep state.

An example of a "sleep word" is shown in FIG. 8. Sleep state is readily accomplished with the finder because the wake word is sufficient to alert a controller from a drowsing low power state to a fully listening state to catch the identifier at the suffix of the phrase.

So we see an "attention" phrase that arouses the finder listening function, and a "define" phrase or tone that in a short tonal burst, causes the right finder to go into "notification mode" (also termed here "alert state", and the other finders to remain silent. For FIND ME finders, if there are more than one, then all of them will go into notification, and hence the advantage of the kits having distinct species of finders, in which distinct "define" tones are used to distinguish each finder.

As another advantage, the voice mode serves as a wake up for the finder, so that other radiotag functions can spend more time in sleep mode and conserve power. The DSP chip is very responsive to the generic attention phrase, and will wake up when the code phrase is spoken.

In other instances, radiotag finder devices comprise cache memory and are programmable to store in memory and do pattern matching on a "FIND X" code phrase where the "X" is customized by a user.

Figure 9:
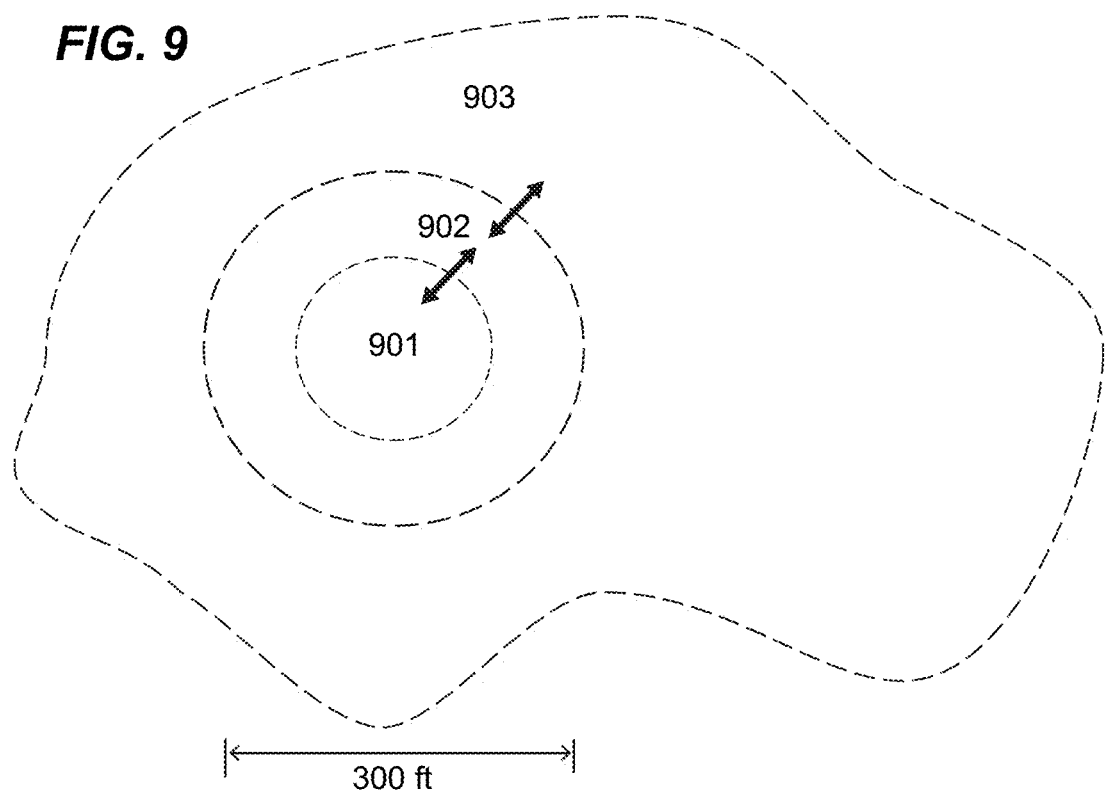
FIG. 9 summarizes the proximity logic used in the finder and radiotag combination.

FIG. 9 is a schematic of finder logic combining local "voice mode" finder functions and local area network "Bluetooth mode" finder and tracker functions. The devices contain not only the voice recognition hardware, but also a radiotag finder-tracker that can be used with a smart device to locate and track radiotagged items. After misplacing an item, the user may say, "FIND X" (where X is a name of a thing) and the item-finder pair will sound out and show its location within a voice range indicated here by area 901. But if the finder pair is out of voice range 901, then within the Bluetooth transmitter range 902 the user can use a smart device to display a virtual map showing an overlay with the position of the radiotag marked for retrieval (as earlier described in U.S. Pat. Nos. 9,392,404, 9,564,774, and 9,774,410, which are incorporated here by reference). In remote radio locator mode, as the user gets close to the location marked on the virtual map, but then in voice mode, the voice command can be used to cause the device to answer by flashing a light and making a sound so that the user can recover the item.

In remote mode, the map will also show if the finder pair is moving, and if it is moving, the location can be tracked. The user can also send a notification to the item to announce its presence, so as to request assistance in finding it. Once found, a button on the device can be used to signal that the notification was received. When a button on the device casing is pressed, the finder will recite the telephone number of the owner.

In this embodiment, the finder is provided with a radio-beacon locator. Users not interested in pairing the beacon with a smart device and application can use the voice finder as a standalone feature, but the beacon locator is particular effective when it supplements the voice finder.

Voice and radiotag finders may be used to create a synergy in energy conservation. The DSP chip will typically sleep unless actuated. Actuation is passive in that a piezo microphone is configured to output an electric pulse that wakes up the DSP chip, which can then perform all or some of its functions as needed. The sound pressure on the microphone must go through a bandpass filter in order to generate a "wake" signal to the DSP chip. Once the chip is awake, it will evaluate the signal and pattern match it to a code phrase sound signature in its memory. If there is a match, the DSP chip may wake up other functions of the device. Thus the microphone and DSP chip combination is the wakeup gatekeeper for the device and the wake up signal is audio.

The Bluetooth core also is configured for power savings. Bluetooth listens essentially continuously for radio signals matching its requirements, but at very low power in a light sleep mode. The device with then wake up only parts of the core chip that are needed to process a radio signal. Other parts of the chip will go to sleep whenever not in use. It can also be completely turned off if desired and still respond to a button press or other power up command.

In use as a radiotag finder or voice finder, there can be a hierarchy of wake and sleep modes. When used with a smart device, the radiotag functions may take priority over the voice functions, but in some environments, such as night in a home environment where errant radio signals can cause nuisance alarms, the voice function may take priority. Also, where the user is looking for an object and does not get a response to a voice command, the device may be set up to automatically switch to radio after a certain number of cycles so as to avoid fruitless repeats. But when the radio finder shows that the needed object is in close radio proximity, so close that the user should be able to hear or see the object, then the user should be able to switch to voice mode so as to better tune his senses to hear or see the device. The switch from radio to voice mode can be indicated on a smart device and accompany a notification that the object is close by. The same feature can be achieved with a hub. Similarly, where a cellular radiotag is provided, the data transmission is energy intensive, but is needed if the object is farther away than voice or Bluetooth can reach. If a Bluetooth contact suddenly becomes available, then the cellular transmission can be turned off to save power.

Alternatively, if the user requests, the radio tracker can be in Bluetooth mode so that community devices (other users) can be listening for the radiotag Bluetooth emission. Bluetooth radiotags were initially built as radiobeacons and will announce themselves to other Bluetooth radios at a regular frequency. When a community Bluetooth device encounters the radiotag on a missing object, the administrative server can issue a rapid command to turn on and increase the frequency of cellular radiotag transmissions. This enables the user to take advantage of the higher finder functionalities of triangulation and AGPS for getting coordinates of the missing object, and can enlist others to help recover the device or can go to the area and look for it, or if it is moving, can continue to track it while moving to intercept it. Thus areas 901, 902 and 903 form a hierarchy of search areas, each with characteristic power requirements, and the search strategy may be optimized to minimize power drainage while maximizing the efficiency in locating the object.

The Bluetooth radio is actually the most economical tool in power usage, but is limited because voice commands are inherently more direct and efficient, and because Bluetooth radio range is at most a few hundred yards in line of sight. Also, a voice search can take advantage that your voice can be aimed in a particular direction, whereas radio is much more omnidirectional. Thus there is an inherent advantage in being able to switch to voice command when very close, and a need to switch to cellular radiotag mode when searching for something that is clearly far away. By setting up Bluetooth to guide the user close to the object and then switching to voice command, a significant improvement in power efficiency for searching is obtained.

The logic for using voice finder, Bluetooth radiotag finder, and cellular radiotag finder technology is described with respect to FIG. 9. Voice finder is effective within a limited range 901, the Bluetooth range 902, depending on the generation of transceivers, goes out to 300 or 1000 ft at most. By using a cellular radioset built into the device, the range is essentially global. When "voice mode" fails, a smart device configured to seek out the location of a radiotag can be used (when the radiotag device is in "Bluetooth mode") to find devices in the immediate vicinity, and when used in when the radiotag device is in "cellular radioset mode", can ping and detect locations via cellular tower networks around the country or around the world.

A smart device can be trained to listen for the particular identifiers of the radio signal and detect their approximate distance. We can also set up rules and permissions in the smart device or a cloud host administrative center whereby certain actions or notifications are associated with loss of signal when the radio beacon is separated from a minder smart device, and notifications or actions when the signal returns to within reception range. Thus the radio beacon when operated with a compatible application and smart device, can notify a user if a keychain or wallet has been left behind when leaving an appointment, and can help locate a vehicle by sending a notification when the vehicle's beacon signal is detected. These functions are operative without use of a virtual map function, and operate best in direct line of sight. Added logic can be employed to address false positives. For example, a clock is set up to notify motions that occur inside or outside a range of hours in the day. In other instances, the beacon radio includes a sensor module that can perform accelerometry, so a signal indicative of a weakening signal in combination with a signal indicative that the beacon is not moving is strongly likely to be true if and only if the beacon has been left behind, particularly during hours of the day when the user is expected to be out of the house, or the familiar radio environment of the house is not detected. Similarly, an indication that the beacon is on the move while the smart device is motionless (it too has an accelerometer), or the radio signal is changing in intensity even though the smart device is in a fixed location, can only mean trouble, and a notification is fully warranted.

Acoustic signals and radio signals drop in power by the square of the distance. Thus signal strength is a rough indicator of proximity, and there are limits on how far a signal will carry and remain understandable. For the human ear, with direct line of sight, the carry distance of a normal voice is less than a block. For a bluetoothed radio with line of sight is a 100 yards or more, but not much more. Performance may be worse in noise and radio crowded space and may necessitate use of more power to the antenna.

Figure 10:
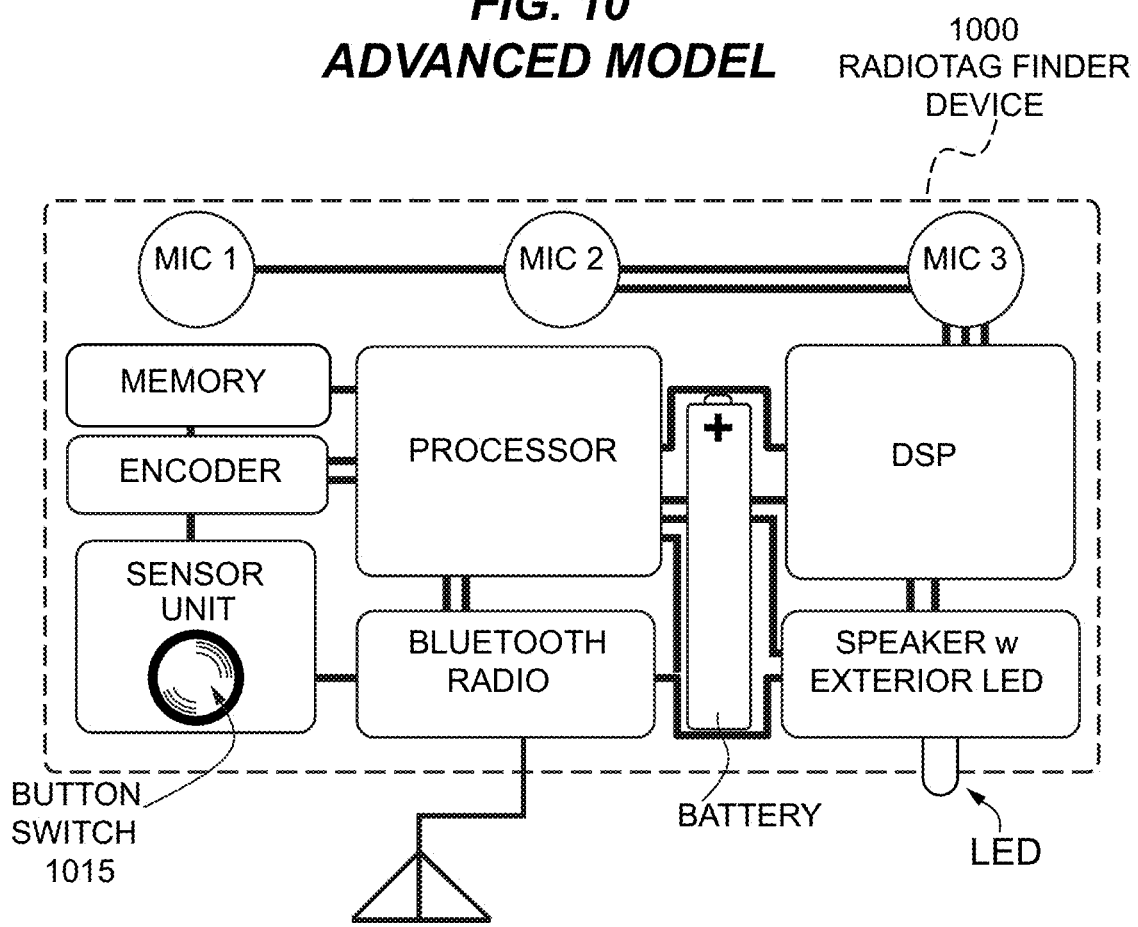
FIG. 10 is a schematic of an advanced radiotag finder model 1000 with finder-tracker functions that can be attached to any object that potentially could be lost or misplaced.

FIG. 10 is a schematic of an advanced radiotag model 1000 with finder-tracker functions that can be attached to any object that potentially could be lost or misplaced. In some instances, the finder-tracker pair will be identified by a stock coded phrase such as "FIND ME", and will respond when its circuitry hears and recognizes the code phrase. In other instances, the user may program a more specific phrase, such as "FIND ID", "FIND WALLET", "FIND BACKPACK", and so forth. A device having multiple functions can be carried in a pocket and can respond to phrases like "FIND CAR" by causing a map to be displayed on a smart device that is coupled to the finder-tracker. The device can also find a missing smart device. A button on the radiotag device, when pressed, can be set up to cause the smart device to ring a tone or to flash in the dark, so that the device is a two-way finder device. These devices can also include dual radio sets and antenna, one for Bluetooth and (not shown) another for Cellular wireless networking.

The processor is generally a microcontroller, but can have the full function of a CPU if desired or can consist mostly of firmware. Here the DSP is a separate chip and receives audio in from three microphones set up for background noise cancellation. The device is battery powered. Besides the Bluetooth radioset, the device also contains a sensor package that includes a button switch 1015, non-volatile memory and cache memory, an encode for formatting radio messages or for applying an encryption, and a display module shown here with an LED and a speaker for announcing its location when the user is close enough to see or hear the display.

Figure 11:
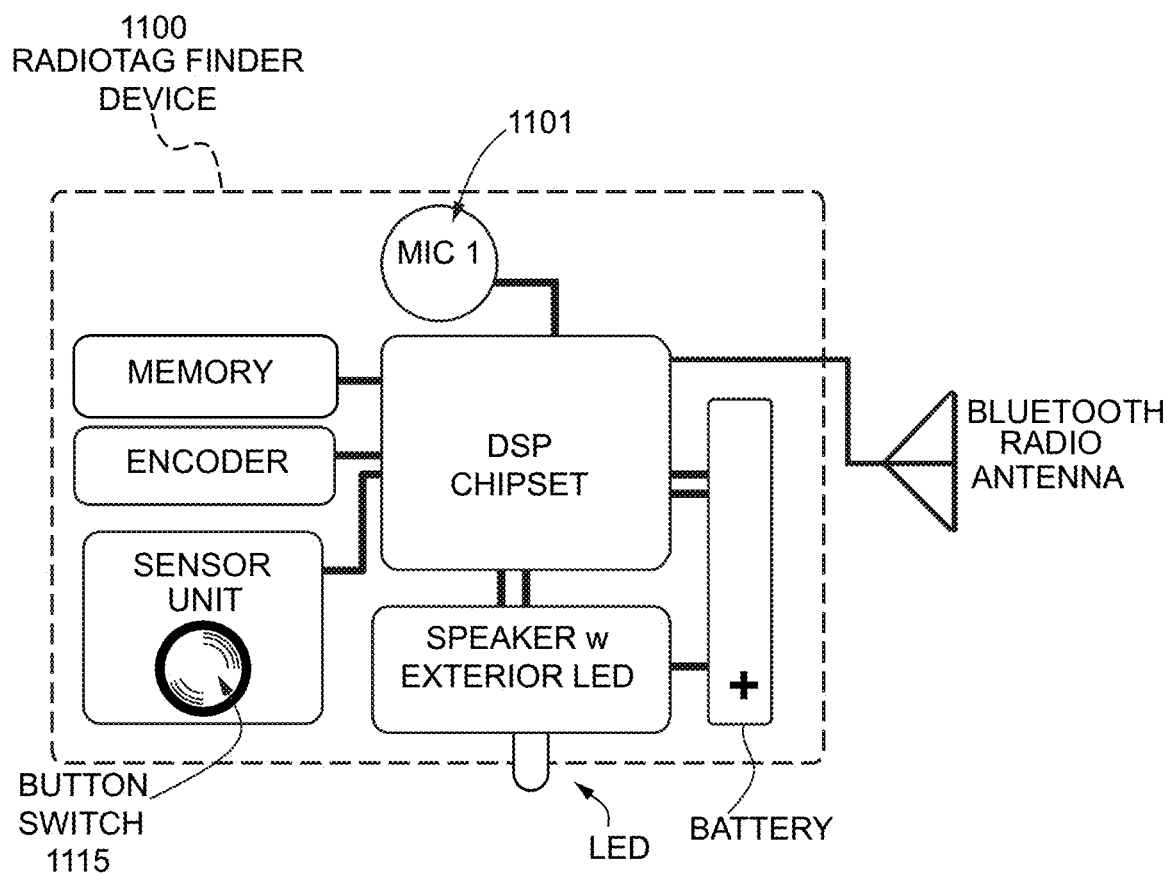
FIG. 11 is a schematic of a compact radiotag 1100 that takes advantage of integration of the DSP chip with a processor and Bluetooth radio.

FIG. 11 is a schematic of a compact radiotag finder-tracker 1100 that takes advantage of integration of the DSP chip with a processor and Bluetooth radio. Integration of microcontroller function and radio control into a DSP chipset reduces size and improves power consumption. Again the DSP chip receives an electrical pulse from a microphone/filter combination in order to wake up. Shown here is a single microphone 1101 with bandpass filter, generally a piezoelectric microphone or an electret microphone. This model also includes a button 1115 or mechanical switch that is operatively connected to the microcontroller. By pressing the switch, the user can access advanced features of the device in Bluetooth mode and can turn off the alarm display in voice mode.

In some embodiments, the compact radiotag finder-tracker can be embedded in or as part of a host object or may be permanently attached to the host object. Thus for example a television remote control can be supplied with a radiotag finder-tracker having a "FIND X" voice or radio finder capability.

Figure 12:
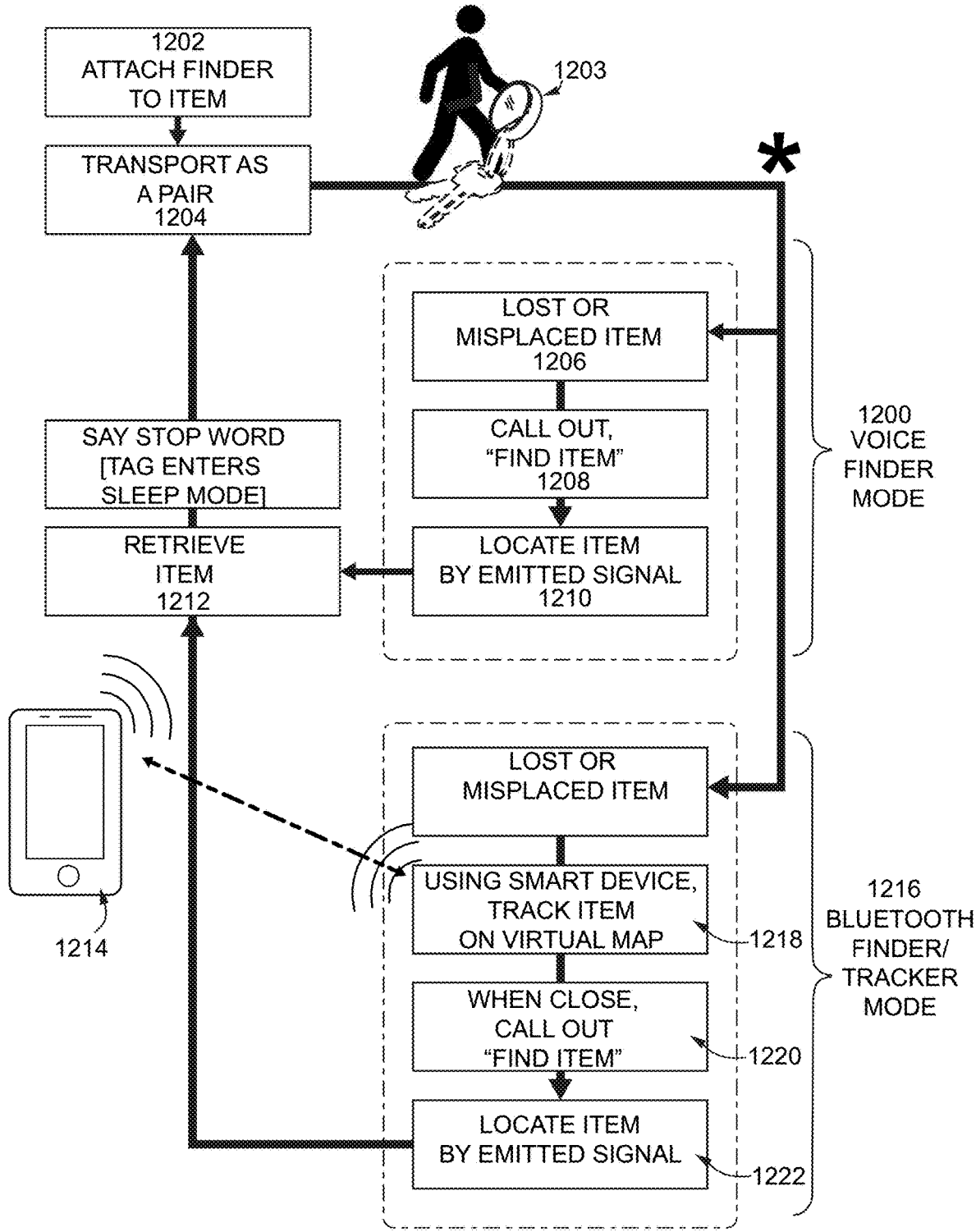
FIG. 12 is a schematic representation of a method of finding or tracking an item enabled by an advanced model of the radiotag device having both a voice mode and a remote Bluetooth mode

FIG. 12 is a schematic representation of a method of finding or tracking an item enabled by an advanced model of the radiotag device having both a voice mode and a remote Bluetooth mode. In preparation, the user attaches 1202 the radiotag to the item to be found. The item and the radiotag are then carried as a pair 1203. An individual is shown walking with the paired item and radiotag, but at a point along the way (indicated by the asterisk *), the item is lost. This could occur because it is dropped, or because it is put down or misplaced 2016. In a first attempt to recover the item, the user can call out the attention phrase and the code phrase 1208. If the radiotag is in range of the user's voice, the radiotag will respond by going into alert state and emitting an audible or visual signal to help the user find the item 1210 and retrieve it 1202. This is termed, "voice finder mode" 1200. Saying a "stop word", "sleep word," or "hibernate word" puts the radiotag into sleep mode to save power.

Figure 14:
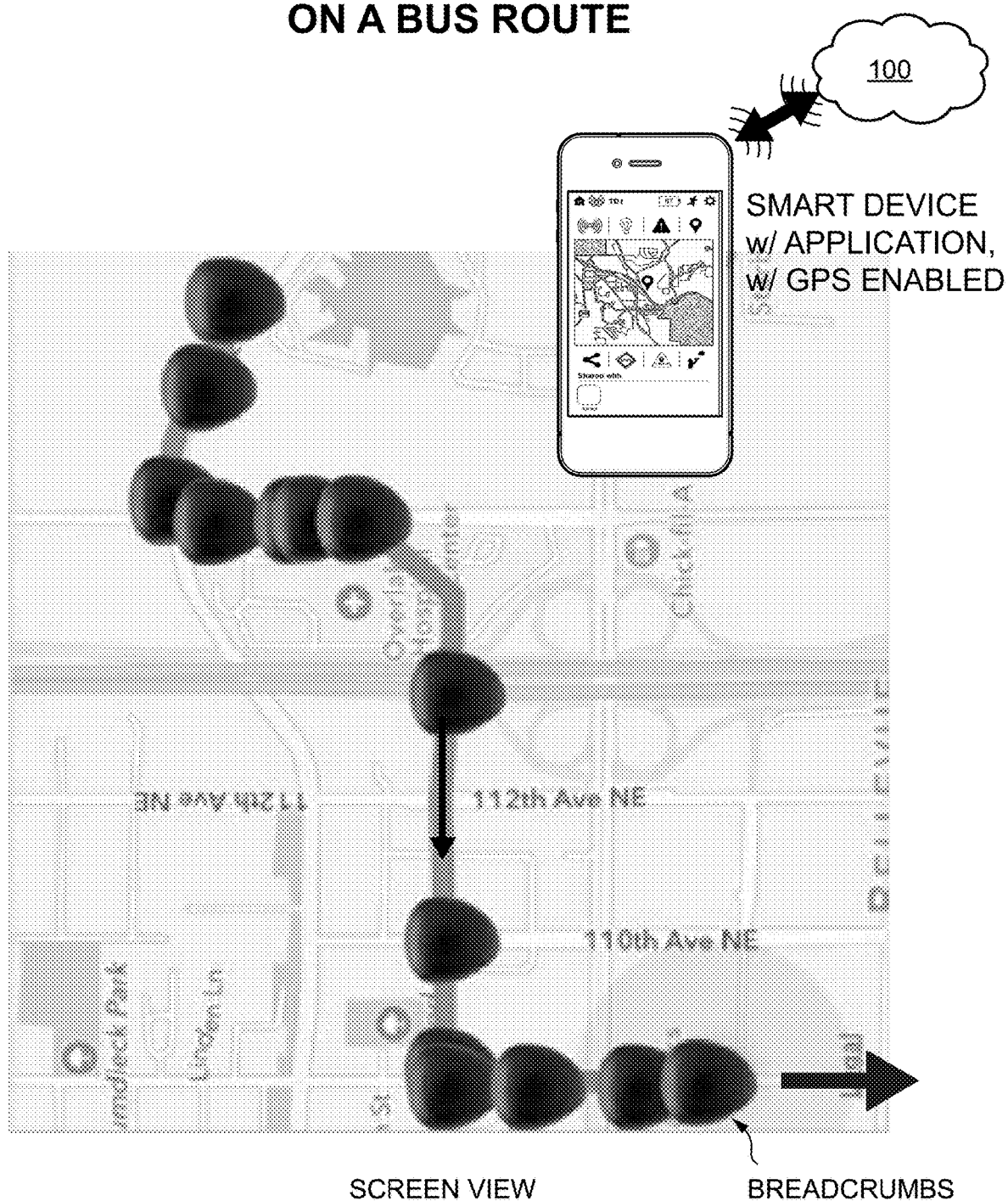
FIG. 14 is a sample virtual map that can be presented as a screenshot on a smart device set up to track a radiotag finder as shown in FIG. 13. Breadcrumb" is a term of art and refers to a radio contact with the beacon, given a time stamp, and aggregated with other position data.

The user has another choice however, if the radiotag has been paired with a programmable smart device 1214. The smart device program is designed to establish radio contact with the radiotag of pair 1203 and can assess the radiotag's radio proximity and issue simple commands to the radiotag. Ordinarily, in Bluetooth mode 1216, the Bluetooth radioset will periodically wake up and broadcast its radio identity and any data. The smart device 1214 will capture the broadcast and can respond according to circumstances. If the item is lost, the user can track the lost radiotag on a virtual map, such as shown in FIG. 14. The last position where the radio signal was detected can be displayed, or an entire waypath that shows the items movement during a day. Generally this is done in concert with a cloud host administrator to store all the data. Then, when the user has gotten as close as possible using the radio locator, the user can switch back to voice mode 1200 simply by calling out the code phrase 1220 as shown. The radiotag pair is then readily located 1222 by its emitted audible or visual display.

Thus the voice and radio modes are complementary and can be used to find and track items both on a remote scale and in a near scale. By using the DSP to activate voice mode, a power savings can be achieved by putting the Bluetooth radio into sleep mode.

And the Bluetooth mode can be turned off when in a safe environment such as the user's home, during the night when the user has no expectation to go anywhere, and can be turned back on when the radiotag moves unexpectedly, or when the user is on the move but the radiotag is left behind, for example.

Earlier work on Bluetooth radiotag systems that was commonly owned at the time of filing includes US Pat. Ser. No. 14/301,236 filed 10 Jun. 2014, Ser. Nos. 14/301,213, 14/820,393 filed 6 Aug. 2015, Ser. No. 14/820,475 filed 6 Aug. 2015, Ser. No. 14/967,339 filed 13 Dec. 2015, Ser. No. 15/072,699 filed 17 Mar. 2016, Ser. No. 15/681,806 filed 21 Aug. 2017 and Ser. No. 15/482,811 filed 9 Apr. 2017, all said patents and patent applications being incorporated here in full for all purposes.

Figure 13:
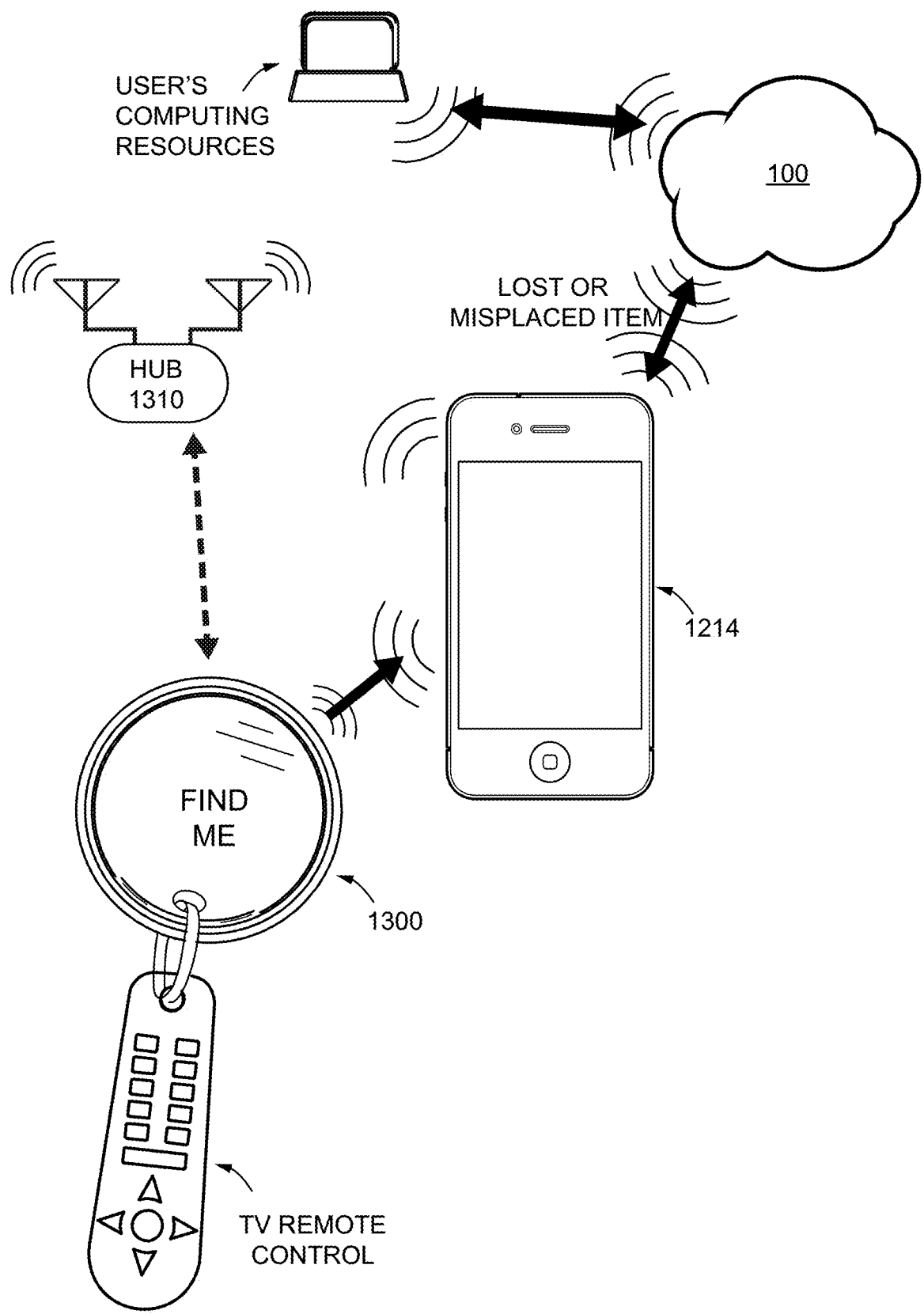
FIG. 13 is a schematic of a system in which the radiotag 1300 is used in combination with a LAN or WAN network to find and track personal objects, here illustrated by a TV remote control.

FIG. 13 is a schematic of a system in which the radiotag finder-tracker 1300 is used in combination with a LAN or WAN network to find and track personal objects, here illustrated by a TV remote control. While the easiest way of finding a TV remote is usually to call out "FIND TV" and listen for a response near the couch, this may not always work if the remote control was thrown out with the newspapers. So the radiotag provides a supplemental locator system. The radiotag advertises its presence using a bluetoothed radio in the beacon that is recognized by a smart device 1214 such as the user's cellphone that is equipped with a simple application, generally in conjunction with a cloud host 100. The cellphone will detect the radiotag even if the application is not installed, but the application provides a ready way to detect the radiotag and display its location on a virtual map. The "FIND X" device 1300 can also be commanded to go into an alert state when the user, carrying the cellphone, gets close. A user may also have a computer and can sign into an account with the cloud host to find and track the missing item.

Optionally a hub 1310 can be incorporated when a network within a defined local area such as a household is intended. The hub can serve as both a LAN and a WAN and is typically plugged in to an AC power supply. The radiotags may be in radio communication with a "hub" that acts as a LAN router having a range limitation characteristic of the hub radio set. In all instances, the radiotags may be organized into groups, here termed a "hive" under common control and generally with common permissions. This organization is an aid in setting up groups of radiotags for household use on the one hand, versus office use or vehicle use, on the other hand. Each hive can be independently programmed with customized functions. Alternatively, any compatible smart device may take the place of the hub, but hubs are specially configured to interact with beacons and are generally provided with a customized user interface (as displayed on a smart device for example, but also programmable and operable from a personal computer, desktop, laptop, or PDA) and may also include a microphone and speaker for conducting verbal interactions.

This configuration with a "hub" largely solves the issue of range and location because the hub's location is generally permanent and the range is no longer limited to the low power output of the BTLE antenna. The hub can have both a microphone and a speaker, but the microphone may be used to pick up voice commands such as "FIND X" and relay those over the radio network to the selected radiotag for activating a display alert. In this way, the voice finder mode is supplemented or coopted by the radiotag system that is built in, and while appearing to act as a voice finder system, in fact may act via radio, and hence can overcome disadvantages of a noisy environment or sound insulation built into many homes. The radio system can have more complex levels of permission, so also offers a way to customize the alert displays and to tie the system into a smart device or devices with more flexibility in administration of the system.

Earlier work on such systems is commonly owned and includes US Pat. Ser. No. 14/820,475, Tracking Device Program with Remote Controls and Alerts, filed 5 Aug. 2015, and Ser. No. 14/301,236, titled "Tracking Device System", filed 10 Jun. 2014, all said patents and patent applications being incorporated here in full for all purposes.

Advantageously, the hub can be configured with a microphone and speaker, and may be operative with voice commands so as to complement and enhance the radio capabilities of the more portable radiotag finder-tracker devices. The hub listens for signals from the tracking devices and also voice commands. The hub has Bluetooth or other wireless communication apparatus and can sense the range of each tracking device within its effective field. Upon receiving signals from one or more tracking devices, the hub relays information associated with the tracking devices to the cloud/internet administrative site. Likewise, the hub may send control information received from the cloud/internet site 100 to each or all the tracking devices, to a smart device, or to other computing machine. Voice commands may be recognized on board the hub or by conveying digitized voice signals to the cloud. The combination of voice commands in a radio environment rich in sensor data and signals realizes a high level of synergy that augments convenience of use. The beacons can sample the radio traffic in a defined vicinity and collect information about the proximity of other radio devices, their state (such as battery power available), and their location. By providing nicknames for the radiotags, for example, the user can issue commands directly to one beacon or to clusters of beacons in a hive. The synergy is in part a function of the rich sensory context provided by the hive as a sensor mesh. The sensor mesh can be extended as a mesh network using beacons owned by the user and also incorporating third-party beacons with compatible programming into ad hoc networks that surround the user in home and work environments.

FIG. 14 is a sample virtual map that can be presented as a screenshot on a smart device set up to track a radiotag finder as shown in FIG. 13. Breadcrumb" is a term of art and refers to a radio contact with the beacon, given a time stamp, and aggregated with other position data. The screenshot can be generated from a log file of "waymarks". Here a user's radiotag finder, working with software on a companion smart device, supports collecting a series of waymarks, stored on a cloud server 100, in a chronological sequence as a bus follows its route through Bellevue, Wash.

Figure 15:
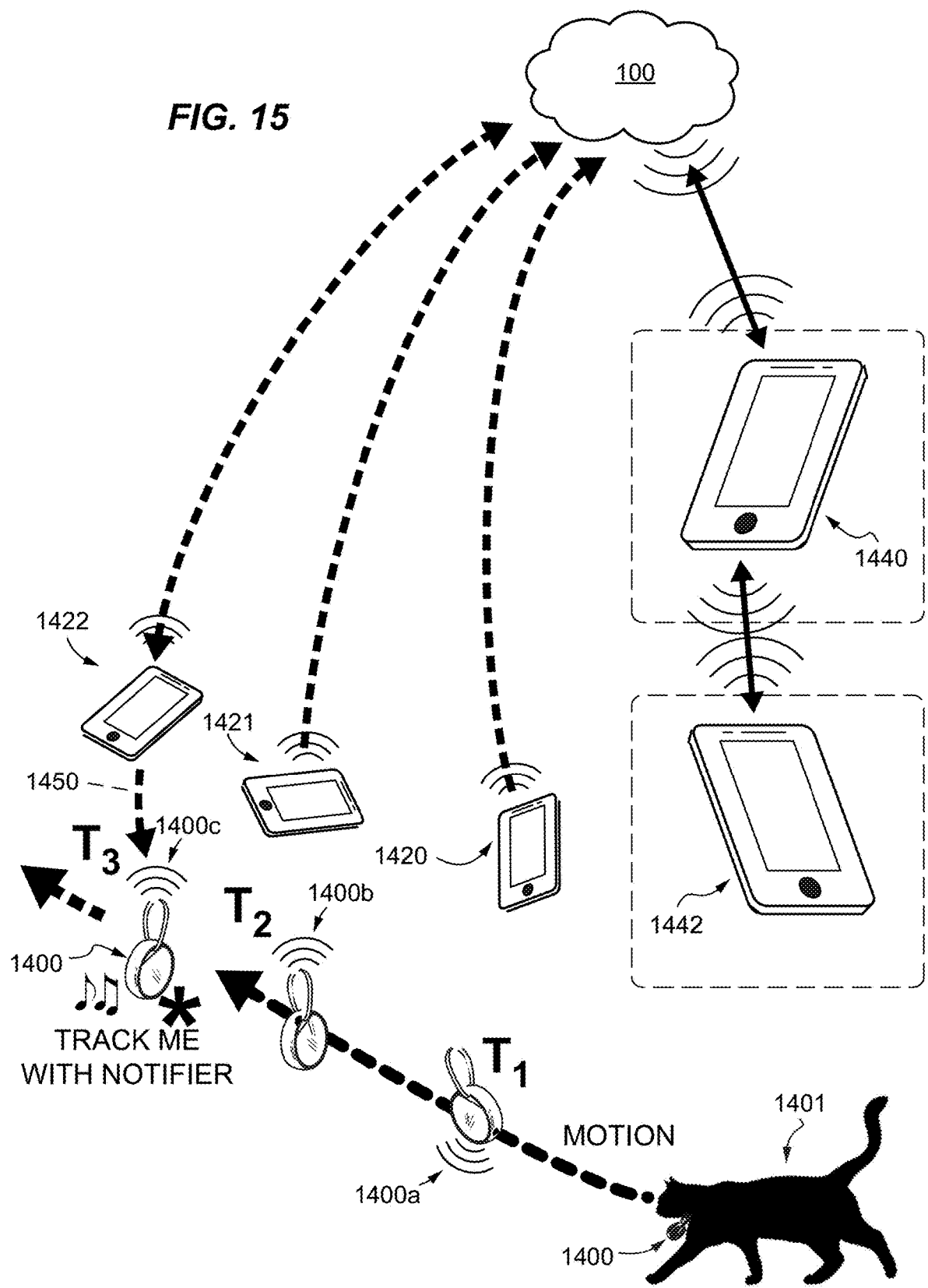
FIG. 15 is a view of a radiotag 1400 as a tool for tracking a cat 1401.

FIG. 15 is a view of a radiotag finder-tracker 1400 as a tool for tracking a cat 1401. Surprisingly, the tone emitted by the beacon may be used to signal the cat to return home. Smarter breeds such as Siamese will readily learn a signal that can reliably be associated with a meal and a warm bed.

In this view multiple smart devices are used to form a virtual geofence of strangers. Where a community exists in which a community tracking application is installed on multiple smart devices 1420, 1421, 1422 in the neighborhood, a radio contact with the radiotag 1400, when captured on any of the smart devices, is forwarded with a timestamp and location information to a cloud host 100 that puts together a virtual map and can present that map on a screen of the cat owner's smart device 1440, or can be related to a smart device 1442 of a friend of the cat owner.

In this instance, the path of the cat is depicted with three timepoints $T_1$, $T_2$ and $T_3$, each corresponding to a position (as given by the smart device) and time shown as 1400a, 1400b, 1400c. Each of these datapoints is picked up by one of the community smart devices 1420, 1421, 1422 and transmitted to the cloud host. If the cat wanders too far, such as in an encounter with smart device 1400c, then the cloud host may execute a preprogrammed instruction, conveyed through smart device 1422, to activate 1450 the radiotag speaker so that a bell sound (at asterisk, *) is emitted, or a sound of the owner's voice, calling the cat home.

Many businesses have spring up to help associate identification in pet collars or implantable RF identity chips with a telephone number in the event the animal is found as a stray or killed by traffic. The inventive beacons offer the advantage of directly notifying the pet owner of the animal's location and even setting a perimeter outside which the animal is not permitted to go. Using cloud services, a veterinarian or stranger who finds the animal can directly look up the telephone number of the pet owner and describe the animal's situation and whereabouts, saving much grief and worry.

The beacons may be used as training aids. By operating a smart device, the owner can set limits on the animal's behavior, and reward responses to a first notification tone with a treat when the dog's response is the correct one. Also, in the case of dog's, a dog that breaks free from a leash can be taught to return when the beacon sounds a second tone. The use of distance limits is discussed in more detail in FIG. 9.

Figure 16A:
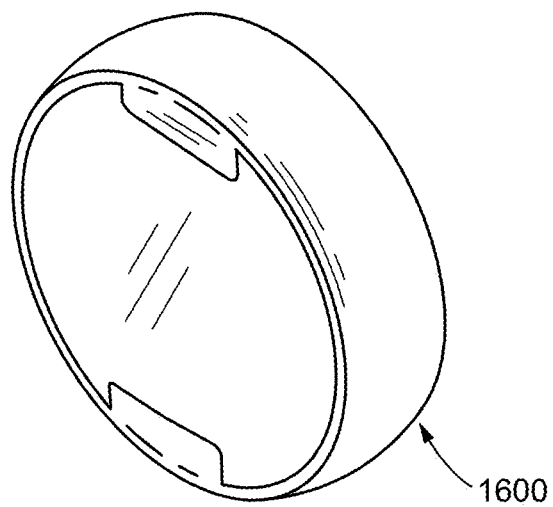
FIG. 16A shows a voice tracker with a built in array of microphones and a pair of piezo speakers. A schematic in exploded view is shown in FIG. 16B.
Figure 16B:
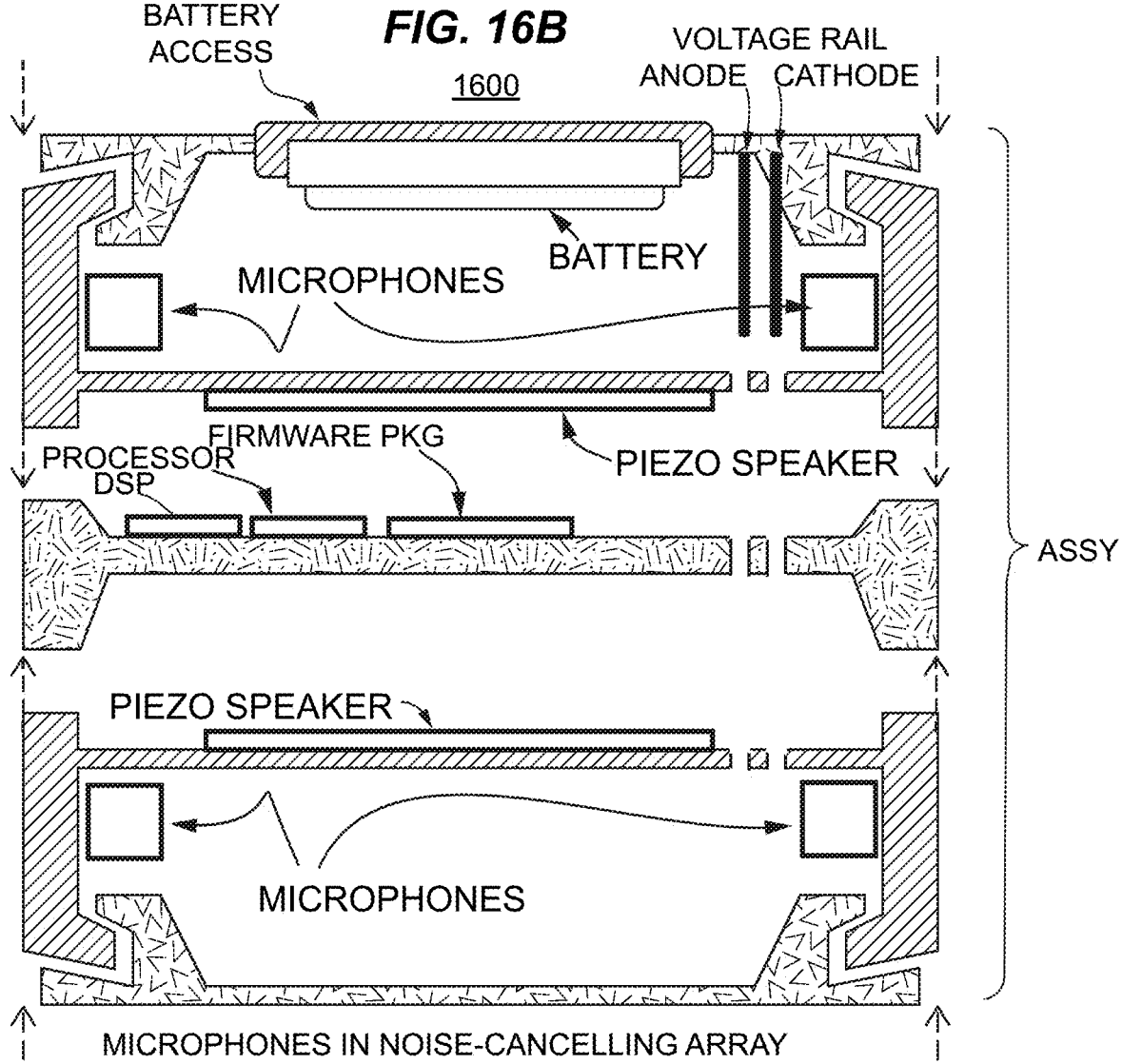

FIG. 16A shows a voice and radio finder-tracker 1600 with a built in array of microphones and a pair of piezo speakers. A schematic in exploded view is shown in FIG. 16B. The housing consists of three pieces that stack together. There are two endpieces that snap in to seal the stack. The topmost endpiece has a battery access cap for replacing the battery. Power is conveyed to each level of the stack by a pair of voltage rails (high and ground) in the form of pins that pass through contact points of each level during assembly.

The central layer contains logic and processing chips, including here a firmware package that directs the speakers. The chips include a DSP chip for processing inputs from the piezo microphones, which are arrayed on the top and bottom of the device. The two piezo speakers are mounted on an inside membrane of the top and bottom layers so that the body of the device serves as a resonance chamber fastened on a stiff central layer. The top and bottom layers are selected from a dampening material that mellows out the speaker output. Dashed lines show the method of final assembly of each of the subassemblies.

Figure 17A:
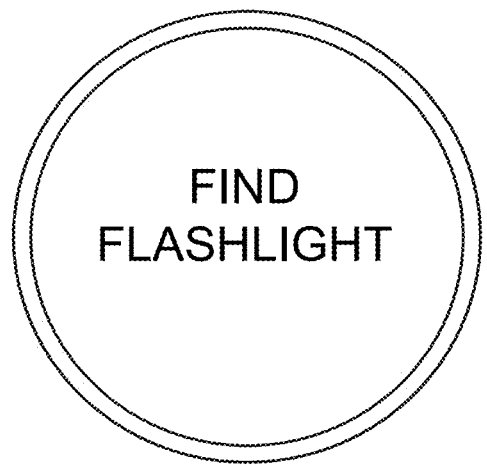
FIGS. 17A, 17B and 17C illustrate the voice radiotag in different configurations. Each one is labelled to indicate the nature of what it is intended to do.
Figure 17B:
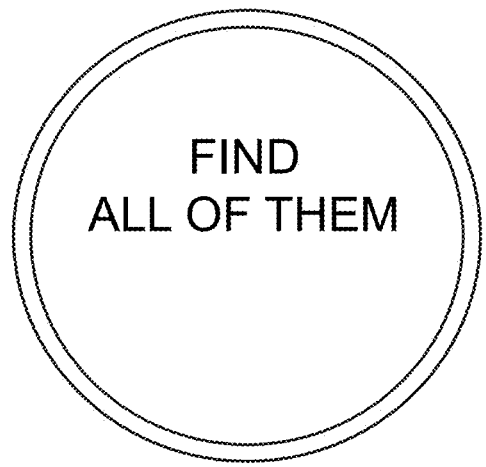
Figure 17C:

FIGS. 17A, 17B and 17C illustrate the voice radiotag in different configurations. Each one is labelled to indicate the nature of what it is intended to do. In a simple variant, shown in FIG. 17A, a radiotag is labelled, "FIND FLASHLIGHT", and may be activated by articulating the code phrase. Because the device includes an LED and the housing is translucent, the flashlight is easily found in the dark by using the voice command to turn on the LED.

"FIND ALL OF THEM" is a variant intended to be associated with a cluster of items, such as those taken with a user every day to work. The cluster may include a wallet, keys and notebook, for example, and in that case three radiotags are needed, one on each item. The radiotag attached to each of the devices will sound off in turn when the code phrase is spoken, and will go silent when the user picks them up. In this way, the user can quickly gather all the times in the group and speedily get going. Similarly, when at a job site, the user can round up the items and make sure nothing is left behind when leaving.

"GET SOME HELP" is a more complex variant, and requires a radiotag with Bluetooth radioset and more preferably, with a companion Cellular radioset. The battery power in the device is sufficient to send a minimum of data over a cellular connection and generally the default connection is to an administrative server address that can be routed across a cellular network. If for example, a driver has attached the radiotag behind the rear view mirror in an automobile, and is in an accident, the shock of impact is sufficient to set a flag in the device processor and to initiate a data message to the cloud server. This is illustrated in more detail in FIG. 18. In this view, the device 1800 is affixed within the automobile to a hard surface, generally by an adhesive patch or hook-and-loop fastener. In an initial step, the customer will pair the device with the customer's smart device. A companion software application is installed on the smart device and guides the customer through the steps. The device can then be attached inside the vehicle. The device includes a 9-axis accelerometer that is operatively connected to the device processor. The device can be supplied with a "low battery" indicator but is intended for extended use. In the event of a collision, the shock of impact will trigger the device automatically, or the customer will vocalize a code phrase, "GET HELP", that will cause the device to beep as confirmation that the command has been recognized. The device then uses its Bluetooth radioset to contact the customer's smart device 1810 (or any third party smart device 1811 in radio proximity) and sends an instruction. The instruction can be a command to call a friend and display a location and a request to send help, or more typically, a command to send the time, location, and an indication that the collision flag has been triggered to a cloud host. The cloud host will access the customer's profile for added instruction that have been preprogrammed and customized by the customer during setup, and will then attempt to contact the customer using the smart device as a telephone. If that fails, the cloud host will call one or more of the designated help numbers and make a notification of the location and the circumstance that an air bag has been deployed and a collision impact detected. In more advanced models, the device will include a speaker and even if the smart device cannot be operated, will be able to allow a conversation between the friend or the dispatcher. When using a third party smart device, the cloud server may be able to transfer the dispatcher to the third party who can provide information about the nature of the accident.

Figure 19:
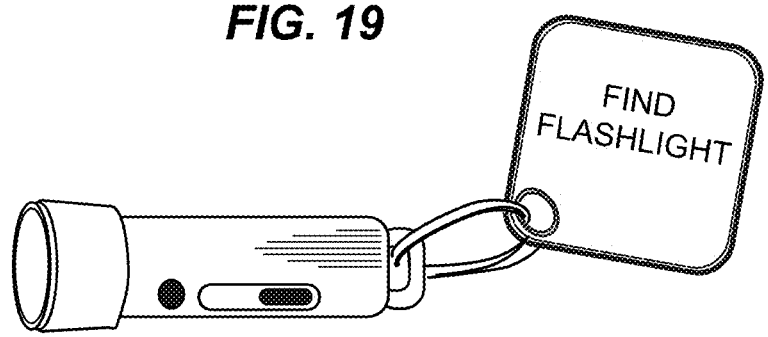
FIG. 19 is a view of the radiotag in a condition of use to mark a flashlight so that when the user verbalizes the words. "FIND FLASHLIGHT", the radiotag will light up and can be found in the dark.

FIG. 19 is a view of the radiotag in a condition of use to mark a flashlight so that when the user verbalizes the words. "FIND FLASHLIGHT", the radiotag will light up and can be found in the dark. A beeper may also be activated to lead the user to the flashlight using audible clues to its location. This is a simple low tech solution that requires only the user to attach the radiotag to the flashlight and it will then work automatically until its battery is exhausted. The same audio beeper may also be used to indicate that the battery is weakening and needs to be replaced.

Figure 20:
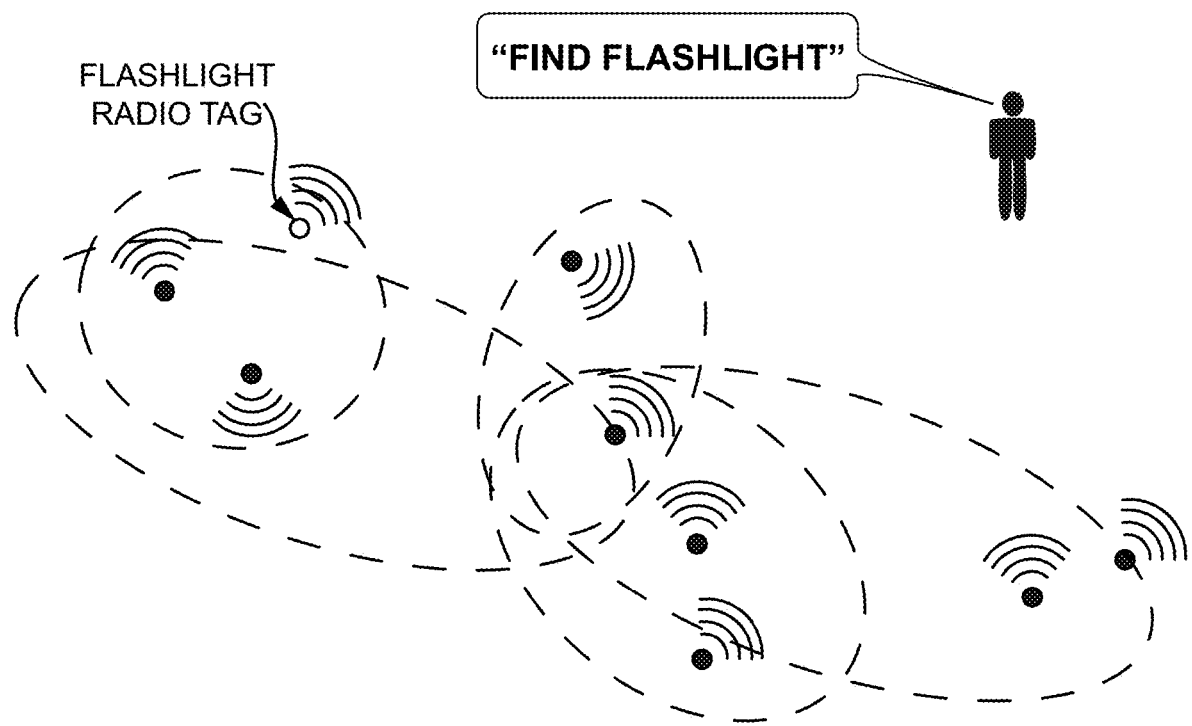
In FIG. 20, the user vocalizes FIND FLASHLIGHT and the radiotag attached to the flashlight lights up.

The use of Bluetooth radio offers some surprising synergies. Bluetooth devices do not sleep in the sense of turn off, they continue to listen for relevant radio traffic in low energy STANDBY, and activate only needed functions when a message is detected. This promiscuous connectability enables a passerby's Bluetooth device to continuously sample the local Bluetooth scatternet environment around them, and to be sampled themselves. A wealth of information is revealed in the Bluetooth transmissions, starting with UUIDs, which can be matched to "global phonebooks" of UUIDs and can be flagged by administrative cloud servers where owners have set up the devices with special instructions. In FIG. 20, the promiscuous nature of the Bluetooth scatternets is illustrated, each pairing is an ad hoc mesh network in which each device is capable of multiple simultaneous pairings.

Approximate ranges and positions are apparent from signal strength as a function of the path taken by the moving passersby device, and the information can be uploaded to a cloud and aggregated to obtain a consensus position of any Bluetooth device, a resource that can be referred to later so that a user/subscriber's location can be remembered.

In our hands, Bluetooth architecture has been discovered to be ideally suited for "find me" functions. Objects and persons of interest are radiotagged by attaching a Bluetooth Tracking Device and the position of the device in the sea of radio transmissions is periodically updated. For example, a smartphone is readily trained to find missing radiotags. A keychain with a Bluetooth radio fob is caused to go into an alarm state so that anyone close enough to hear the alarm can readily find the keychain.

In FIG. 20, the user vocalizes FIND FLASHLIGHT and the radiotag attached to the flashlight lights up. However, the same command can be achieved by pressing a button on a smart device and the radio mesh network will alert the needed radiotag to display its presence by an audio or visual display. Advantageously, a visual display is preferable for finding things in the dark.

Bluetooth has the extended battery life needed for true portability. And the accuracy of Bluetooth position locating by RSSI can approach or surpass the capacity of civilian GPS locators (about 10 yards either way).

The promiscuity becomes a surprising virtue, and leads to emergent properties that would not have been predicted as larger clusters of Bluetooth devices in a home or around the globe are deployed. Because each device can serve any function in any network, the devices are entirely interchangeable, and this has a profound effect on how to use a community of devices to search for any one lost device, and that is an emergent property of a system of the invention. Bluetooth devices spontaneously form autonomous FH-CDMA peer-to-peer (P2P) mesh networks. Autonomous ad hoc Bluetooth networks are unique because there are no differences in the radio devices in the network; they are true peer-to-peer networking tools in which one device can act as master in one or more networks while simultaneously acting as slave in other networks.

So, a connection with one Bluetooth device can be used to repeat that information to another Bluetooth device in series. Thus the finder can recruit other devices to reach out until the needed radiotag is found.

Bluetooth Tracking Devices are not readily affixed to a smartphone or a laptop and need not be. In a surprising turn, a small Bluetooth device with a button on its housing can achieve the reverse—the radiotag can be used to locate the smartphone if misplaced by causing the smartphone to beep or light up. And with suitable programming, the radiotag can control smart devices such as smartphones. All that is required is to install a needed "app" in the smartphone. This is a welcome feature and one that would not have been predicted by those familiar with other radio systems.

The ubiquitous capacity to join multiple networks and change network memberships at random while in a sea of radio transmissions and Bluetooth devices entering and leaving radio proximity is termed a "scatternet ad hoc environment" and this is a unique radio capacity that distinguishes Bluetooth networking device communities and is the source of the criticality that differentiates the inventive systems from those based on GPS, WiFi, or cellular networks.

FIG. 21 shows that flickering Bluetooth mixed node connections are possible because of the true peer-to-peer device architecture. Each device is multipotent. What is implicit in this figure is that the connections can change dynamically each time a 0.6 ms "slot" opens up in a transmission stream. This promiscuity allows random network connections to be formed and broken without restriction and allows each net to merge with other nets. Also illustrated is the capacity of the nets to share nodes so as to form larger nets, as consistent with a mesh network. By definition, the first unit to initiate a radio cluster is the "master" and defines the access code (identifying the master), frequency hop regime (FH-CDMA), and master clock for synchronization. Slave units synchronize by adding an offset to their native clock so that an absolute reference clock is not required (contrast GPS). A header packet also includes a 3-bit slave identifier so that the master can address transmissions to individual slaves or broadcast en masse (point-to-multipoint). UUIDs (universally unique identifiers) assigned by the device manufacturer can also be used to identify individual devices, and are sufficiently unique that a global address book of devices can be implemented.

What makes this relevant is that a Bluetooth device is always listening for other Bluetooth devices, and on finding one, the first information exchanged are the identifiers of the device. These can be instantly relayed to a cloud host, and during the brief time in which the two Bluetooth devices are in contact, the Cloud host can indirectly convey new instructions to a lost Bluetooth device via a Cellular connection to a smart phone in an anonymous third party's hands.

Frequency hopping was intended to reduce interference in the low-energy Bluetooth radio traffic from higher energy transmissions such as local WiFi devices, microwaves, and so forth. The narrow band, fast moving hops, each with a nominal dwell time of 625 us, is coordinated by a BT master in each cluster, so that instantaneously only a small bandwidth (1 MHz) is occupied and most of the potential interference in the ISM band is avoided. Filtering is also used to suppress interference, enabling the BT devices to nimbly form full duplex, scatternet clusters even in ISM radio-dense environments.

What makes this relevant is that Bluetooth in SCAN and PAGE mode will detect a brief serendipitous overlap of compatible code in one of the 0.6 microsecond slots that do 1600 frequency hops per second, enabling asynchronous transmission of commands. The discovery process is one of trial and error. But that process can be agnostic as to who the device belongs to, so Bluetooth devices meet everyone they encounter and send the log of their encounters to a cloud host according to software of the invention. That turns a large community of Bluetooth users into a giant machine for finding lost Bluetooth radiotags.

Four operational layers are implemented in Bluetooth:
STANDBY
DISCOVERY
  Scan, Page, Inquiry
ASYNCHRONOUS TRANSMIT/RECEIVE
SYNCHRONOUS TRANSMIT/RECEIVE Newer Bluetooth devices have the capacity to turn off parts of the stack selectively according to whether they are needed or not, and to turn them back on with minimal latency, so as to achieve a very impressive energy efficiency.

But importantly, a standby condition is implemented which enables Bluetooth devices to be "always listening" for compatible radio traffic even when other functions are at low power idle or off. This always listening function allows a Bluetooth beacon, for example, to communicate with a Bluetooth chip of a smart device so that the internal Bluetooth chip can "wake up" the smart device from sleep mode, something that cannot otherwise be done remotely unless pre-programmed to a schedule. And because the Bluetooth device is always listening, no stray Bluetooth signal in the local environment escapes notice.

Thus the radio architecture is robust in achieving an unparalleled capacity to capture local Bluetooth radio chatter and to link to and exchange data with those devices regardless of identity. Within radio proximity, the physical range of devices from a receiver can be monitored by RSSI and the most proximate devices given priority in making connections. For a Bluetooth module of a smart device, the identifiers and approximate location of the radio connections can be transmitted to a cloud so that a server can deduce their consensus location and properties. For example, transmissions from a device posted by one user as "lost" can be identified by a passing stranger, and the cloud can notify the proper owner.

At a global scale, embedded Bluetooth radios are becoming a flickering "scatter" network based on the principle that proximate devices seek each other out and on the fly promiscuously configure themselves into networks without need for connection setup. The networks are termed "scatternets" because they are continuously changing—i.e., membership in a Bluetooth network is based on the rule that more proximate devices dynamically replace those with weaker signals. Bluetooth is a true ad hoc network.

While the radiotags of the present invention offer technical novices the opportunity to use the devices in a voice-recognition mode, the devices offer the user an opportunity to understand and user the higher level radio capacity of the devices. In this way, the promise of the Internet of Things becomes accessible to all. EXAMPLES I and II are a few illustrations of the utility of the finder and finder-tracker devices of the invention.

Example I

A device is constructed with an HD Clear DBM IO chipset for digital signal processing, voice recognition, and microcontroller functions, including operation of a bluetoothed radio emitter. The device implements hibernation features to deliver advanced user life expectancy. A Vesper piezo microphone with voice bandpass filter enables the device to stay in low power mode unless an electrical pulse characteristic of a voice signal gets through the bandpass filter and unless the electrical signal that is conveyed to the digital signal processor carries a code word or phrase that is a "wake up" word. In this way, a two-stage power saving process is implemented in the voice finder devices.

Example II

When the device is attached to a personal device that typically accompanies its owner has not been moved for a long period of time, a few hours, several days or a week, depending on personal settings, the device will automatically begin broadcasting a radio signal advertising its presence, optionally with a request to return the item to its owner, and may be set up to enunciate a phrase or a radio signal such as "I'M LOST" in hopes that someone will pick it up and get it back to where it belongs or at least to an area in which radio WAN is likely to hear the broadcast and notify the owner. The application provided with the device may be shared by multiple users so that a community of devices can serve to detect the device and re-unite it with its owner. This utility is discussed in more detail in US Pat. Publ. No. 2016/0182170, said patent document being incorporated herein for all that it discloses and suggests.

As can be seen, the invention may be defined by a scope of features and properties, in which the original claims filed with this US Provisional Patent Application are representative but not limited thereto. The applicants reserve the right to at a later date and time of their choosing, make claims directed at any subject matter reasonably supported by the disclosures here or in subsequent filings claiming priority to this document.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

We claim:

1. A method for finding an object, the method comprising:
   a) receiving, with a microphone of a radiotag attached to an object, a spoken phrase that includes an actuation segment and a code segment;
   b) generating, with the microphone, an electrical signal that is related to the actuation segment and the code segment;
   c) in response to the electrical signal, generating, with circuitry of the radiotag, a notification capable of being sensed by a human; and,
   d) generating, with a Bluetooth radioset of the radiotag, a Bluetooth radio signal having a signal strength and a periodicity.

2. The method of claim 1, further comprising:
   (a) with a control device, receiving the Bluetooth radio signal from the radiotag;
   (b) with the control device, tracking the Bluetooth radio signal on a map displayed with the control device; and
   (c) in response to another instance of the spoken phrase, generating, with the radiotag, a notification capable of being sensed by a human.

3. The method of claim 1, wherein the notification includes an audio notification.

4. The method of claim 1, wherein the notification includes an audiovisual display.

5. The method of claim 1, wherein the notification includes a visual display.

6. The method of claim 1, wherein the spoken phrase is "FIND X", the actuation segment corresponds to "FIND", the code segment corresponds to "X", and "X" is a name of the object to which the radiotag is attached.

7. The method of claim 1, wherein the spoken phrase is stored in a non-volatile memory of the radiotag and is not customizable.

8. The method of claim 7, wherein the radiotag is configured to generate the notification without user setup before the microphone receives the spoken phrase.

9. The method of claim 1, further comprising storing the spoken phrase in a memory of the radiotag before receiving the spoken phrase.

10. The method of claim 1, further comprising storing the code segment to customize the radiotag for finding an object related to the code segment.

11. The method of claim 9, further comprising programming the radiotag to recognize the spoken phrase in response to a person speaking the spoken phrase within range of a microphone of the radiotag.

12. The method of claim 11, further comprising;
    determining, with the radiotag, whether the spoken phrase is from an authorized user of the radiotag; and
    generating the notification and the Bluetooth signal in response to determining that the spoken phrase is from an authorized user.

13. The method of claim 1, further comprising detecting, with the radiotag, a radio command from a control device.

14. The method of claim 1, wherein generating a Bluetooth radio signal includes generating the Bluetooth radio signal in response to a command from a control device.

15. The method of claim 1, wherein generating the notification includes generating the notification in response to a command from the control device.

16. The method of claim 1, further comprising instructing a user to speak a stop word or stop phrase or to press a button on the radiotag to stop the notification.

17. The method of claim 1, further comprising instructing a user to speak a stop word or stop phrase or to press a button on the control device to stop the notification.

18. The method of claim 1, wherein the radiotag comprises a cellular radioset.

19. The method of claim 18, further comprising:
    determining, with the cellular radioset, a location of the radiotag; and
    providing, with the cellular radioset over a cellular network, the determined location to a device.

20. The method of claim 18, further comprising:
    determining, with the cellular radioset, a location of the radiotag; and
    providing, with the cellular radioset over a cellular network, the determined location to a device in response to a request from the device.

21. A radiotag, which comprises
    (a) a portable housing attachable to an object in need of radiotag services;
    (b) wherein the housing encloses:
       i) a microphone and filter combination configured to generate an electrical signal output in response to a vocalization having the frequency of a human voice, the vocalization comprising an actuation segment and a code segment, wherein the code segment defines the object in need of radiotag services;
       ii) a processor with pattern matching capacity and logic circuitry, wherein the processor is configured to awaken in response to the electrical signal output, recognize the actuation segment and the code segment in the electrical signal ouput, generate a validation signal if the code segment matches an electrical pattern in a memory accessible by the processor; and
       iii) a notification circuit with a Bluetooth radio, wherein in response to the validation signal, the notification circuit is configured to generate a notification capable of being sensed by a human and to cause the Bluetooth radio to transmit a receivable radio signal.

22. The radiotag of claim 21, wherein the notification circuit comprises at least one of (a) a speaker configured to make an audio notification or (b) an LED configured to make a visual display.

23. The radiotag of claim 21, wherein the processor is configured to match the actuation segment and the code segment corresponding to the spoken phrase "FIND X" with the electrical pattern accessible in memory, the actuation segment relating to "FIND" and the code segment relating to "X", where "X" is the name of the object to which the radiotag is attached.

24. The radiotag of claim 23, comprising a switch enabled to actuate a microphone record mode.

25. The radiotag of claim 24, wherein the microphone record mode is configured to cause an electrical pattern related to a customizable code segment to be loaded into the memory.

26. The radiotag of claim 25, wherein the electrical pattern related to the customizable code segment in memory is recognized by the processor when a vocalization containing the customizable code segment is spoken within range of the microphone.

27. The radiotag of claim 21, wherein the electrical pattern in memory is preloaded in a non-volatile memory of the radiotag and is not customizable.

28. The radiotag of claim 21, wherein the receivable radio signal enables a control device to display a map showing a location of the radiotag.

29. The radiotag of claim 21, further comprising a cellular radio, wherein the cellular radio is capable of causing a cellular network to report a location of the radiotag to a device.

30. The radiotag of claim 21, further comprising detecting, by the Bluetooth radio, a radio command from a control device.

31. The radiotag of claim 30, wherein the radio command from the control device is a command to generate a notification capable of being sensed by a human.

32. The radiotag of claim 21, which comprises a noise-cancelling microphone array.

33. A radiotag, which comprises a circuit having a microphone and filter combination configured to generate an electrical signal output in response to a vocalization having the frequency of a human voice and articulating a code phrase, in which the electrical signal output corresponds to the acoustic pattern of the code phrase; a processor with pattern matching capacity, logic circuitry and a Bluetooth radio, wherein the processor is configured to awaken in response to the electrical signal output , recognize the code phrase by the electrical signal output, and cause the circuit to initiate a Bluetooth radio transmission from the Bluetooth radio to a control device.

* * * * *